US012548104B2

(12) United States Patent
Sakata et al.

(10) Patent No.: US 12,548,104 B2
(45) Date of Patent: Feb. 10, 2026

(54) PRESENTATION INFORMATION GENERATION DEVICE AND PRESENTATION INFORMATION GENERATION METHOD

(71) Applicant: Mitsubishi Electric Corporation, Tokyo (JP)

(72) Inventors: Reiko Sakata, Tokyo (JP); Saki Matsui, Tokyo (JP); Masami Aikawa, Tokyo (JP); Eiji Yuasa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 17 days.

(21) Appl. No.: 18/663,092

(22) Filed: May 14, 2024

(65) Prior Publication Data
US 2024/0296515 A1 Sep. 5, 2024

Related U.S. Application Data

(63) Continuation of application No. PCT/JP2021/046693, filed on Dec. 17, 2021.

(51) Int. Cl.
G06Q 50/00 (2024.01)
G06Q 10/00 (2023.01)
(Continued)

(52) U.S. Cl.
CPC ......... *G06Q 50/47* (2024.01); *G06Q 10/1093* (2013.01)

(58) Field of Classification Search
CPC .................. G06Q 10/00; G06Q 50/00
See application file for complete search history.

(56) References Cited

U.S. PATENT DOCUMENTS

2008/0133147 A1 6/2008 Ohtsuka et al.
2014/0006137 A1* 1/2014 Melen ............... G06Q 10/1093
705/14.35
(Continued)

FOREIGN PATENT DOCUMENTS

CN 207390763 U 5/2018
CN 209427929 U 9/2019
(Continued)

OTHER PUBLICATIONS

International Search Report and Written Opinion mailed on Feb. 15, 2022, received for PCT Application PCT/JP2021/046693, filed on Dec. 17, 2021, 8 pages including English Translation.
(Continued)

Primary Examiner — Mustafa Iqbal
(74) Attorney, Agent, or Firm — XSENSUS LLP

(57) ABSTRACT

A presentation information generation device includes: a recommended position calculating unit that acquires ventilation equipment information indicating a state of ventilation equipment in a passenger car and outputs recommended position information of a passenger by using the ventilation equipment information; a presentation information generating unit that generates and outputs recommended position presenting information indicating a recommended position of the passenger in the passenger car by using the recommended position information output by the recommended position calculating unit; and a presentation information output unit that outputs, to a presentation device, the recommended position presenting information generated by the presentation information generating unit.

17 Claims, 20 Drawing Sheets

(51) Int. Cl.
  *G06Q 10/1093*  (2023.01)
  *G06Q 50/47*   (2024.01)

(56) References Cited

U.S. PATENT DOCUMENTS

| | | | |
|---|---|---|---|
| 2017/0103491 A1 | 4/2017 | Bora | |
| 2017/0132475 A1 | 5/2017 | Oami et al. | |
| 2017/0169366 A1* | 6/2017 | Klein | G06Q 10/025 |
| 2017/0313322 A1* | 11/2017 | Onorato | B60W 50/0098 |
| 2018/0218470 A1* | 8/2018 | Belwafa | G06Q 50/40 |
| 2019/0120517 A1 | 4/2019 | Gyota | |
| 2020/0072487 A1 | 3/2020 | Fujiwara et al. | |
| 2021/0390807 A1 | 12/2021 | Chaurasia et al. | |
| 2022/0044286 A1* | 2/2022 | Gupta | G06Q 10/0631 |
| 2022/0390938 A1* | 12/2022 | Villar | B60W 60/00253 |

FOREIGN PATENT DOCUMENTS

| | | |
|---|---|---|
| EP | 3 657 088 A1 | 5/2020 |
| EP | 3 822 214 A1 | 5/2021 |
| JP | H07-215603 A | 8/1995 |
| JP | 2001-294384 A | 10/2001 |
| JP | 2005-331209 A | 12/2005 |
| JP | 2007-022681 A | 2/2007 |
| JP | 2010-083647 A | 4/2010 |
| JP | 2012-225590 A | 11/2012 |
| JP | 2014-190686 A | 10/2014 |
| JP | 2018-002362 A | 1/2018 |
| JP | 2018-173864 A | 11/2018 |
| JP | 2021-055928 A | 4/2021 |
| JP | 2021-156565 A | 10/2021 |
| KR | 10-1256366 B1 | 4/2013 |
| WO | 2016/129085 A1 | 8/2016 |
| WO | 2017/098589 A1 | 6/2017 |
| WO | 2017/195286 A1 | 11/2017 |
| WO | 2019/021675 A1 | 1/2019 |
| WO | 2020/089996 A1 | 5/2020 |

OTHER PUBLICATIONS

Office Action issued Mar. 7, 2025 in German Patent Application No. 11 2021 008 346.5, 29 pages.

* cited by examiner

PRESENTATION INFORMATION GENERATION DEVICE AND PRESENTATION INFORMATION GENERATION METHOD

CROSS-REFERENCE TO RELATED APPLICATION

The present application is a continuation of International Application No. PCT/JP2021/046693, filed on Dec. 17, 2021, the entire disclosure of which is hereby incorporated by reference.

TECHNICAL FIELD

The present disclosed technique relates to a presentation information generating technique of generating information to be presented inside and outside a passenger car.

BACKGROUND ART

As a presentation information generating technique, there is a technique of presenting a guidance position in a car interior of a passenger car to the inside or outside of the passenger car.

Patent Literature 1 discloses a technique of presenting a guidance position from a viewpoint of making getting-on/off of a passenger in a passenger car efficient. Specifically, Patent Literature 1 includes: a getting-on/off information acquiring unit that acquires passenger getting-on/off information for a passenger car of an elevator; an empty space information acquiring unit that acquires position information of a passenger in a getting-on/off area of a getting-on place and a getting-on/off area of the passenger car where the passenger comes and goes when getting-on/off the passenger car; a drawing pattern selecting unit that selects a predetermined drawing pattern on the basis of the getting-on/off information input from the getting-on/off information acquiring unit and the position information input from the empty space information acquiring unit; a drawing pattern display control unit that controls a drawing position for the drawing pattern input from the drawing pattern selecting unit on the basis of the position information input from the empty space information acquiring unit; and a drawing device that draws the drawing pattern at the drawing position when drawing position information of the drawing pattern is input from the drawing pattern display control unit. When there is a passenger in the getting-on/off area and the position of the passenger is different from the drawing position, the drawing pattern display control unit inputs the drawing position information to the drawing device.

By the way, a passenger car generally includes ventilation equipment such as a ventilation opening in such a way as to ventilate a car interior.

CITATION LIST

Patent Literature

Patent Literature 1: JP 2018-002362 A

SUMMARY OF INVENTION

Technical Problem

The technique of Patent Literature 1 has a problem that a position that blocks ventilation by ventilation equipment of a passenger car may be presented.

The present disclosure is to solve the above problem, and an object of the present disclosure is to generate presentation information for preventing ventilation in a passenger car from being blocked.

Solution to Problem

A presentation information generation device of the present disclosure includes: recommended position calculating circuitry that acquires ventilation equipment information indicating a state of ventilation equipment in a passenger car and outputs recommended position information of a passenger by using the ventilation equipment information; presentation information generating circuitry that generates and outputs recommended position presenting information indicating a recommended position of the passenger in the passenger car by using the recommended position information output by the recommended position calculating circuitry; and presentation information output circuitry that outputs, to a presentation device including a display, a speaker, or a projector, the recommended position presenting information generated by the presentation information generating circuitry.

Advantageous Effects of Invention

According to the present disclosure, it is possible to provide a presentation information generation device that generates presentation information for preventing ventilation in a passenger car from being blocked.

DESCRIPTION OF EMBODIMENTS

Hereinafter, in order to describe the present disclosure in more detail, embodiments for carrying out the present disclosure will be described with reference to the attached drawings.

First Embodiment

Figure 1:
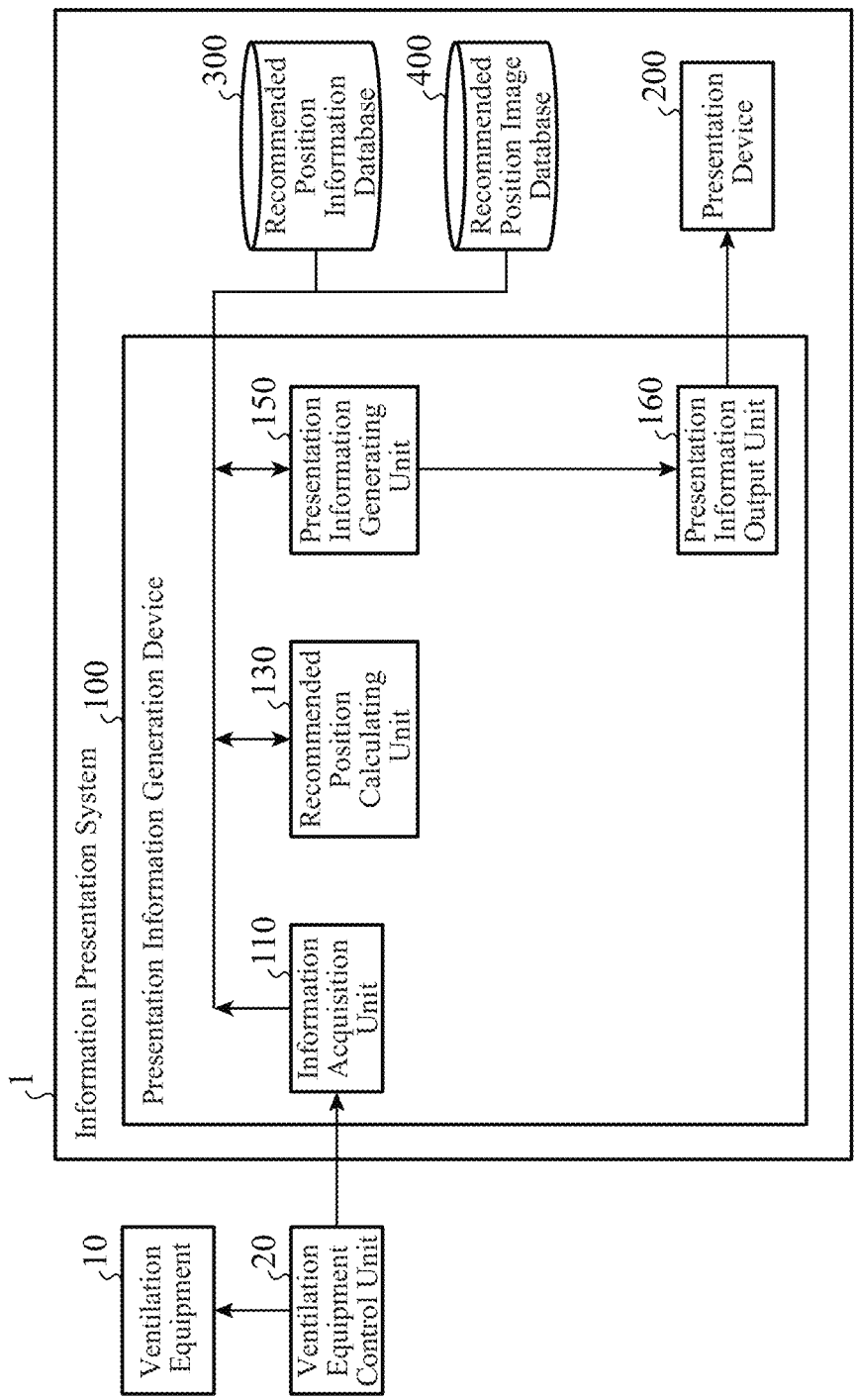
FIG. 1 is a diagram illustrating a presentation information generation device according to a first embodiment of the present disclosure, an information presentation system including the presentation information generation device, and peripheral devices of the information presentation system.

FIG. 1 is a diagram illustrating a presentation information generation device 100 according to a first embodiment of the present disclosure, an information presentation system 1 including the presentation information generation device 100, and peripheral devices of the information presentation system 1.

Figure 2:
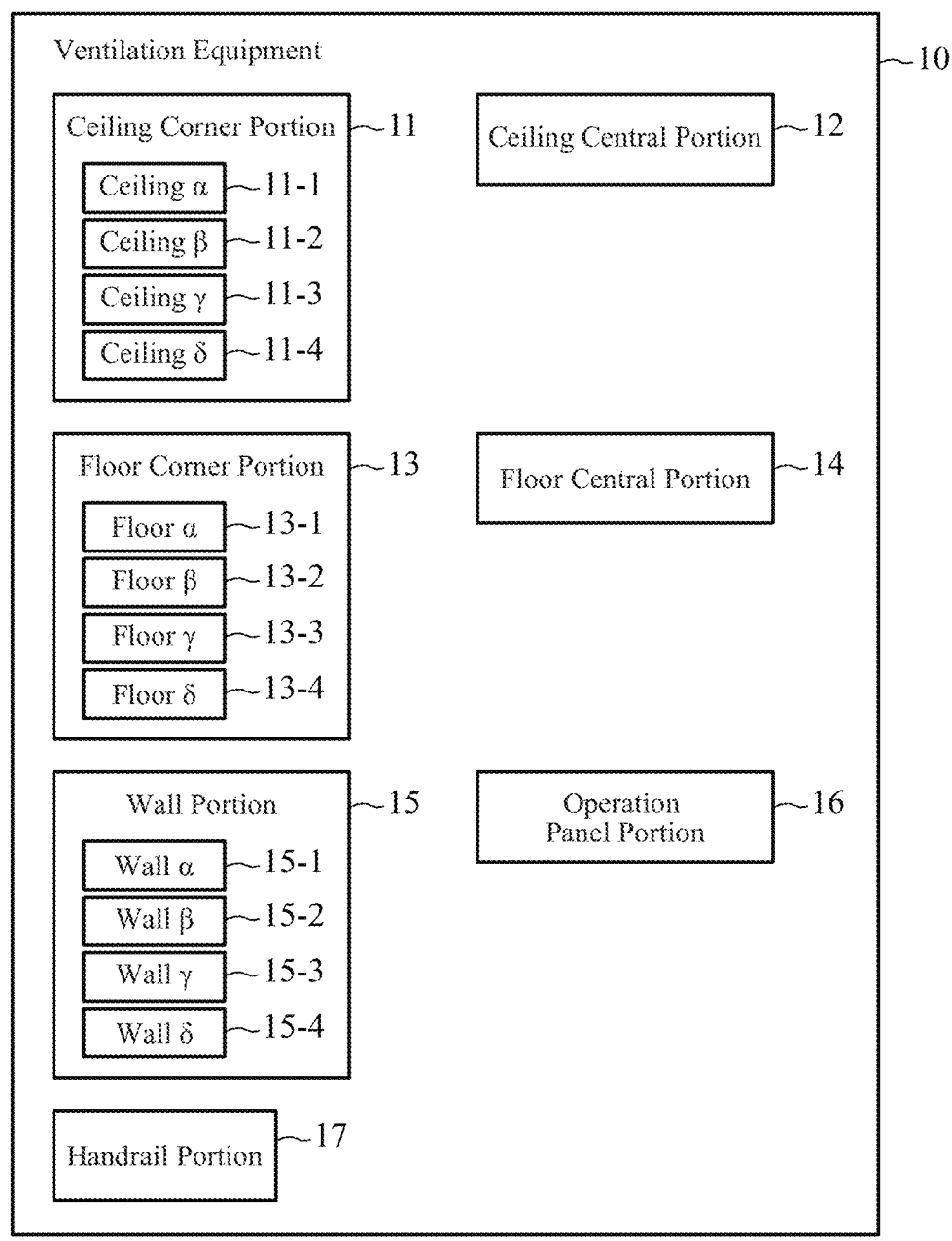
FIG. 2 is a diagram illustrating an example of an arrangement position of ventilation equipment according to the present disclosure.

FIG. 2 is a diagram illustrating an example of an arrangement position of ventilation equipment 10 according to the present disclosure.

The information presentation system 1 illustrated in FIG. 1 is a system that presents information regarding a recommended position of a passenger in a passenger car from a viewpoint of ventilation or air flow in a car interior of the passenger car.

The information presentation system 1 is communicably connected to a ventilation equipment control unit 20 that controls the ventilation equipment 10 in the passenger car.

On, off, a flow rate, or a flow direction of the ventilation equipment 10 can be controlled.

For example, as illustrated in FIG. 2, the ventilation equipment 10 is disposed in a ceiling corner portion 11, a ceiling central portion 12, a floor corner portion 13, a floor central portion 14, a wall portion 15, an operation panel portion 16, and a handrail portion 17.

The ventilation equipment in the ceiling corner portion 11 is disposed, for example, at four places of a ceiling α 11-1, a ceiling β 11-2, a ceiling γ 11-3, and a ceiling δ 11-4. The ceiling α, the ceiling β, the ceiling γ, and the ceiling δ are, for example, four corners of a ceiling surface or four sides of the ceiling.

The ventilation equipment in the ceiling central portion 12 is disposed on the ceiling surface other than the ceiling corner portion 11, and can generate an air flow passing through the center of the car interior, for example, by cooperating with the ventilation equipment 10 disposed at a position other than the ceiling.

The ventilation equipment in the floor corner portion 13 is disposed, for example, at four places of a floor α 13-1, a floor β 13-2, a floor γ 13-3, and a floor δ 13-4. The floor α 13-1, the floor β 13-2, the floor γ 13-3, and the floor δ 13-4 are, for example, four corners of a floor surface or four sides of the floor.

The ventilation equipment in the floor central portion 14 is disposed on the floor surface other than the floor corner portion 13, and can generate an air flow passing through the center of the car interior, for example, by cooperating with the ventilation equipment 10 disposed at a position other than the floor.

The ventilation equipment in the wall portion 15 is disposed, for example, at four places of a wall α 15-1, a wall β 15-2, a wall γ 15-3, and a wall δ 15-4. For example, the wall α 15-1, the wall β 15-2, the wall γ 15-3, and the wall δ 15-4 each correspond to a corresponding one of side surfaces of the car interior.

The ventilation equipment in the operation panel portion 16 is disposed in such a way that a ventilation opening is formed in a partial area of an operation panel that receives operation by a passenger, such as designation of a destination floor or opening and closing of a door in the passenger car.

The ventilation equipment in the handrail portion 17 has a ventilation opening in a peripheral portion of a handrail when the handrail is disposed in the car interior of the passenger car. It is disposed in such a manner that the ventilation opening is not completely blocked by presence of the handrail.

In particular, by inclusion of the ventilation equipment in the ceiling central portion 12 and the ventilation equipment in the floor central portion 14, the ventilation equipment can generate a plurality of air flows including at least an air flow between the ceiling central portion 12 and the floor central portion 14 in the car interior of the passenger car.

The ventilation equipment control unit 20 controls the ventilation equipment in the passenger car.

The ventilation equipment control unit 20 can output ventilation equipment information. The ventilation equipment information is information indicating a state of the ventilation equipment or an operating situation of the ventilation equipment in the passenger car, and is information including, for example, at least one of pieces of information such as on, off, a flow rate, and a flow direction.

The information presentation system 1 illustrated in FIG. 1 includes the presentation information generation device 100, a presentation device 200, a recommended position information database 300, and a recommended position image database 400.

The presentation information generation device 100 acquires a recommended position of a passenger in the car interior by using the ventilation equipment information, and generates presentation information indicating the recommended position.

A configuration of the presentation information generation device 100 will be described later.

The presentation device 200 presents the presentation information generated by the presentation information generation device 100.

The presentation device 200 includes, for example, a display unit and a sound output unit.

The display unit is, for example, a display, and the sound output unit is, for example, a speaker.

In addition, when the presentation device is a projector, the presentation device may perform presentation by performing projection onto a floor, projection onto a wall, projection onto a ceiling, or the like on the basis of the presentation information.

The recommended position information database 300 stores in advance information indicating a state or a situation in the passenger car and recommended position information in association with each other.

In the first embodiment, the information indicating a state or a situation in the passenger car is the ventilation equipment information. The state of the ventilation equipment or the operating situation of the ventilation equipment is related to an air flow in the car interior of the passenger car. Therefore, it can be said that the recommended position of the passenger from a viewpoint of a ventilation situation or an air flow in the car interior is related to the ventilation equipment information. Therefore, in the first embodiment, the ventilation equipment information is used.

The recommended position information is information in which, for example, a floor surface in the car interior is indicated by coordinates.

The recommended position image database 400 stores in advance an image used when the presentation information generation device 100 generates the presentation information.

The image stored in the recommended position image database 400 is, for example, an image (see presentation examples in FIGS. 17, 18, 19, 20, and 21) such as a two-dimensional image or a three-dimensional image indicating the car interior of the passenger car, a human-shaped image, a foot-shaped image, an image representing a position in the car interior with a text, or an air flow image representing an air flow.

A configuration of the presentation information generation device 100 will be described.

The presentation information generation device 100 illustrated in FIG. 1 includes an information acquisition unit 110, a recommended position calculating unit 130, a presentation information generating unit 150, and a presentation information output unit 160.

The information acquisition unit 110 acquires ventilation equipment information.

Specifically, the information acquisition unit 110 acquires the ventilation equipment information from the ventilation equipment control unit 20, and outputs the ventilation equipment information to the recommended position calculating unit 130.

The recommended position calculating unit 130 acquires the ventilation equipment information, and outputs recommended position information indicating a recommended position of a passenger in the car interior of the passenger car by using the ventilation equipment information.

The recommended position calculating unit 130 illustrated in FIG. 1 outputs the recommended position information by referring to the recommended position information database 300.

Note that the recommended position calculating unit 130 may output the recommended position information from the ventilation equipment information with a model learned in advance by using an artificial intelligence (AI) technique.

The presentation information generating unit 150 generates and outputs a recommended position image indicating a recommended position of a passenger in the passenger car by using the recommended position information output by the recommended position calculating unit 130.

The presentation information generating unit 150 illustrated in FIG. 1 acquires an image by referring to the recommended position image database 400, and generates the recommended position image by using the acquired image.

For example, the presentation information generating unit 150 generates a recommended position image in which an image such as a human-shaped image, a foot-shaped image, or a text image is superimposed on an image indicating the car interior of the passenger car.

The presentation information generating unit 150 outputs presentation information including the recommended position image.

When receiving the presentation information output from the presentation information generating unit 150, the presentation information output unit 160 causes the presentation device 200 to present the recommended position image on the basis of the presentation information.

Processing performed in the presentation information generation device 100 according to the first embodiment will be described.

Figure 3:
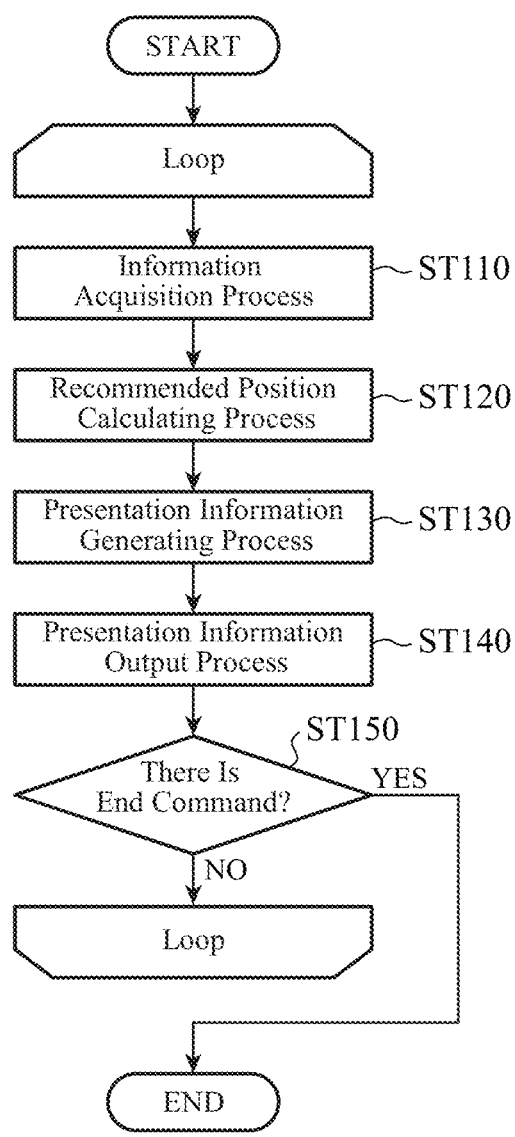
FIG. 3 is a flowchart illustrating processing performed in the presentation information generation device according to the first embodiment.

FIG. 3 is a flowchart illustrating the processing performed in the presentation information generation device 100 according to the first embodiment.

For example, when receiving a start command from the outside, the presentation information generation device 100 starts processing and starts loop processing.

In the loop processing, processes from step ST110 to step ST150 illustrated in FIG. 3 are repeated.

The information acquisition unit 110 executes an information acquisition process (step ST110).

Specifically, the information acquisition unit 110 acquires ventilation equipment information from the ventilation equipment control unit 20, and outputs the ventilation equipment information to the recommended position calculating unit 130.

The recommended position calculating unit 130 executes a recommended position calculating process (step ST120).

Specifically, the recommended position calculating unit 130 acquires the ventilation equipment information from the information acquisition unit 110, and outputs recommended position information for each position in the car interior of the passenger car by using the acquired ventilation equipment information and referring to the recommended position information database 300.

The presentation information generating unit 150 executes a presentation information generating process (step ST130).

Specifically, the presentation information generating unit 150 acquires an image by referring to the recommended position image database 400, and generates a recommended position image by using the acquired image.

The presentation information generating unit 150 generates an image in which the recommended position image is superimposed on an image of the passenger car.

The presentation information generating unit 150 outputs presentation information including the recommended position image.

The presentation information output unit 160 executes a presentation information output process (step ST140).

Specifically, the presentation information output unit 160 acquires the presentation information including the recommended position image from the presentation information generating unit 150, and outputs the acquired presentation information including the recommended position image to the presentation device 200.

When step ST140 is executed, subsequently, a control unit (not illustrated) in the presentation information generation device 100 checks whether there is an end command from the outside (step ST150).

If there is no end command (step ST150 "NO"), the presentation information generation device 100 repeats the processes from step ST110.

If there is an end command (step ST150 "YES"), the processing in the presentation information generation device 100 is ended.

The presentation information generation device according to the present disclosure includes: a recommended position calculating unit that acquires ventilation equipment information indicating a state of ventilation equipment in a passenger car and outputs recommended position information of a passenger by using the ventilation equipment information; a presentation information generating unit that generates and outputs recommended position presenting information indicating a recommended position of the passenger in the passenger car by using the recommended position information output by the recommended position calculating unit; and a presentation information output unit that outputs, to a presentation device, the recommended position presenting information generated by the presentation information generating unit.

As a result, it is possible to provide a presentation information generation device that generates presentation information for preventing ventilation in a passenger car from being blocked.

In the presentation information generation device according to the present disclosure, the ventilation equipment is disposed in such a way as to generate a plurality of air flows including at least an air flow between a ceiling central portion and a floor central portion in a car interior of the passenger car.

As a result, the number of candidates for the recommended position of the passenger in the passenger car can be increased from a viewpoint of ventilation.

A presentation information generation method according to the present disclosure includes: a recommended position calculating process in which a recommended position calculating unit acquires ventilation equipment information indicating a state of ventilation equipment in a passenger car and outputs recommended position information of a passenger by using the ventilation equipment information; a presentation information generating process in which a presentation information generating unit generates and outputs recommended position presenting information indicating a recommended position of the passenger in the passenger car by using the recommended position information output by the recommended position calculating unit; and a presentation information output process in which a presentation information output unit outputs, to a presentation device, the recommended position presenting information generated by the presentation information generating unit.

As a result, it is possible to provide a presentation information generation method that generates presentation information for preventing ventilation in a passenger car from being blocked.

Second Embodiment

In the first embodiment, the mode has been described in which the presentation information indicating a recommended position of a passenger is generated by using the ventilation equipment information.

A second embodiment is a mode in which presentation information indicating a recommended position of a passenger is generated by further using passenger information.

In description of the second embodiment, the description of the configuration described in the first embodiment will be appropriately omitted.

Figure 4:
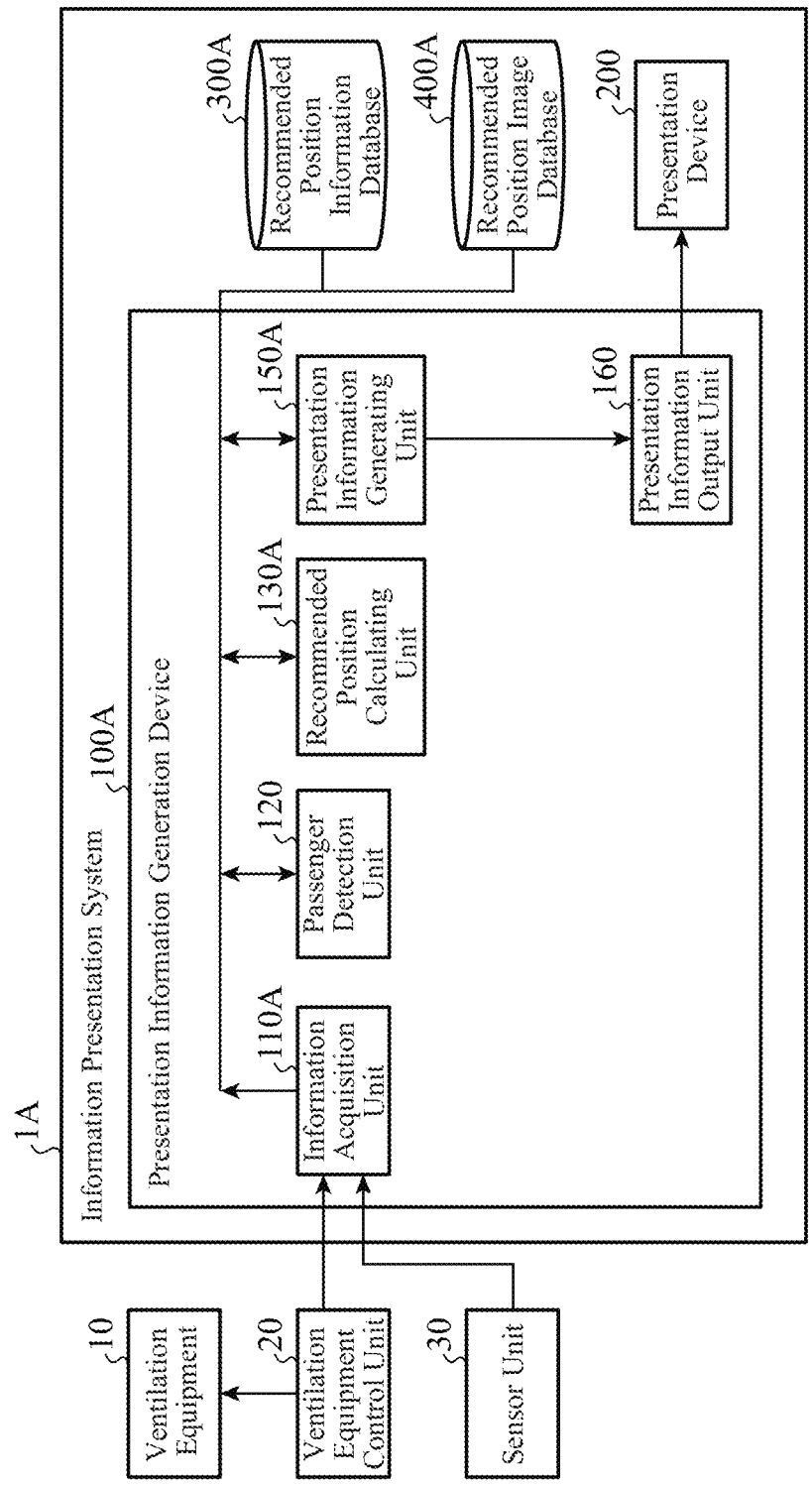
FIG. 4 is a diagram illustrating a presentation information generation device according to a second embodiment of the present disclosure, an information presentation system including the presentation information generation device, and peripheral devices of the information presentation system.

FIG. 4 is a diagram illustrating a presentation information generation device according to the second embodiment of the present disclosure, an information presentation system including the presentation information generation device, and peripheral devices of the information presentation system.

Figure 5:
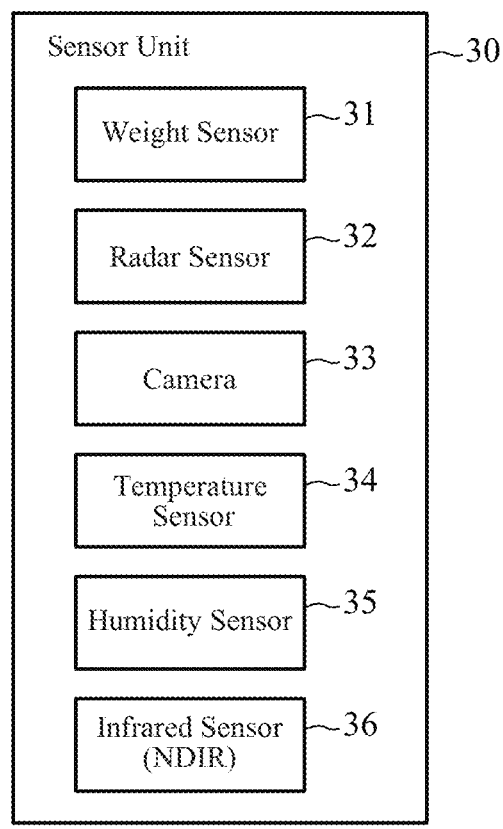
FIG. 5 is a diagram illustrating an example of a sensor included in a sensor unit according to the present disclosure.

FIG. 5 is a diagram illustrating an example of a sensor included in a sensor unit according to the present disclosure.

An information presentation system 1A illustrated in FIG. 4 is further communicably connected to a sensor unit 30.

As illustrated in FIG. 5, the sensor unit 30 includes a plurality of sensors such as a weight sensor 31, a radar sensor 32, a camera 33 (monitoring camera), a temperature sensor 34, a humidity sensor 35, and an infrared sensor 36. The sensors constituting the sensor unit 30 are arranged at positions related to operation of a passenger car, such as in the passenger car or in a car interior.

The sensor unit 30 in the second embodiment outputs sensor data. The sensor data is, for example, a weight value of the passenger car output from a weight sensor, a distance from a radar sensor disposed in the car interior to a passenger in the car interior, or a captured image by a camera disposed in the car interior.

The information presentation system 1A illustrated in FIG. 4 includes a presentation information generation device 100A, a recommended position information database 300A, a recommended position image database 400A, and a presentation device 200.

The presentation device 200 is similar to the presentation device 200 illustrated in FIG. 1, and description thereof will be omitted.

The presentation information generation device 100A acquires a recommended position of a passenger by using ventilation equipment information and passenger information, and generates presentation information in which the recommended position is visualized.

The passenger information is information regarding a passenger that affects an air flow in the car interior, such as a position of the passenger in the car interior, the number of passengers, and a physique of the passenger.

A configuration of the presentation information generation device 100A will be described later.

The recommended position information database 300A stores in advance information indicating a state or a situation in the passenger car and recommended position information in association with each other.

In the second embodiment, the information indicating a state or a situation in the passenger car includes ventilation equipment information and passenger information.

The recommended position image database 400A is similar to the recommended position image database 400 illustrated in FIG. 1, and description thereof will be omitted here.

A configuration of the presentation information generation device 100A will be described.

The presentation information generation device 100A illustrated in FIG. 4 includes an information acquisition unit 110A, a passenger detection unit 120, a recommended position calculating unit 130A, a presentation information generating unit 150A, and a presentation information output unit 160.

The information acquisition unit 110A further acquires sensor data from the sensor unit 30.

The sensor data is, for example, a weight value of the passenger car output from a weight sensor, a distance from a radar sensor disposed in the car interior to a passenger in the car interior, or a captured image by a camera disposed in the car interior.

The passenger detection unit 120 detects a passenger in the passenger car.

Specifically, the passenger detection unit 120 acquires sensor data from the sensor unit 30 via the information acquisition unit 110A. The passenger detection unit 120 detects a passenger in the passenger car by using the sensor data. The passenger detection unit 120 outputs passenger information indicating the detected passenger.

Similarly to the passenger information described above, the passenger information is information regarding a passenger that affects an air flow in the car interior, such as a position of the passenger in the car interior of the passenger car, the number of passengers, and a physique of the passenger.

The recommended position calculating unit 130A outputs recommended position information of the passenger in the passenger car by further using the passenger information indicating the passenger detected by the passenger detection unit 120. This is performed for obtaining a recommended position depending on an air flow in the car interior in consideration of a case where the air flow may change depending on a passenger in the passenger car (the number of passengers, a position of the passenger, a height of the passenger, and the like), which may affect ventilation.

The recommended position calculating unit 130A illustrated in FIG. 4 outputs the recommended position information by using the ventilation equipment information and the passenger information and referring to the recommended position information database 300A.

Note that the recommended position calculating unit 130A may output the recommended position information by using the ventilation equipment information and the passenger information with a model learned in advance by using an AI technique.

The presentation information generating unit 150A generates a recommended position image indicating a recommended position in the passenger car by further using the passenger information.

Specifically, the presentation information generating unit 150A generates an image in which a human-shaped image corresponding to a position of a passenger indicated by the passenger information is superimposed on the recommended position image of the car interior.

The presentation information output unit 160 is similar to the presentation information output unit 160 illustrated in FIG. 1, and description thereof will be omitted.

Processing performed in the presentation information generation device 100A according to the second embodiment will be described.

Figure 6:
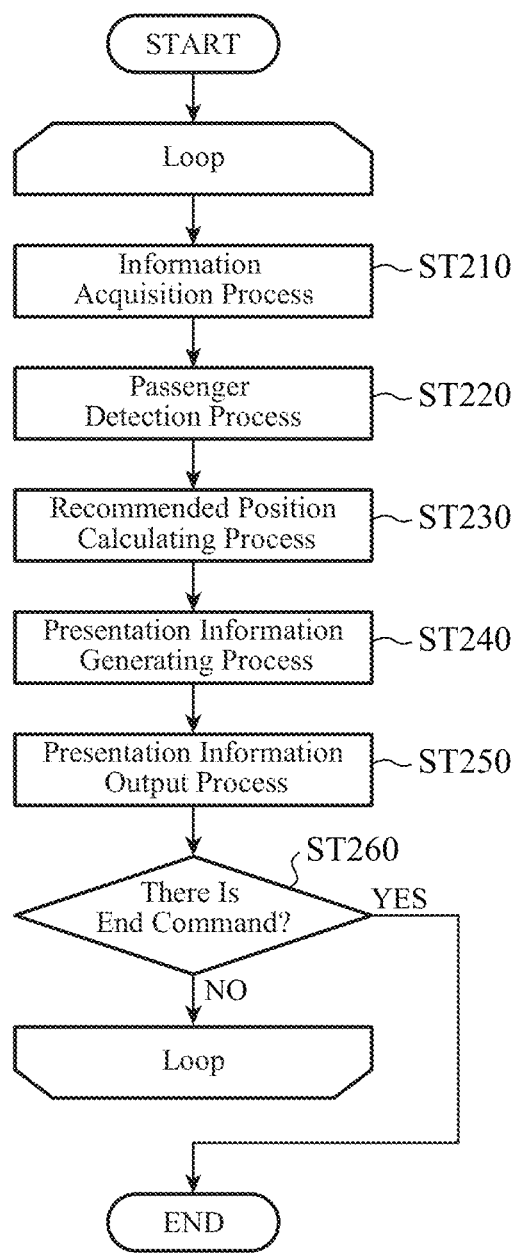
FIG. 6 is a flowchart illustrating processing performed in the presentation information generation device according to the second embodiment.

FIG. 6 is a flowchart illustrating processing performed in the presentation information generation device according to the second embodiment.

For example, when receiving a start command from the outside, the presentation information generation device 100A starts processing and starts loop processing.

In the loop processing, processes from step ST210 to step ST260 illustrated in FIG. 6 are repeated.

First, the information acquisition unit 110A executes an information acquisition process (step ST210).

Specifically, the information acquisition unit 110A acquires ventilation equipment information similarly to the information acquisition unit 110 of the first embodiment, and further acquires sensor data from the sensor unit 30.

Next, the passenger detection unit 120 executes a passenger detection process (step ST220).

Specifically, the passenger detection unit 120 acquires the sensor data from the sensor unit 30 via the information acquisition unit 110A. The passenger detection unit 120 detects a passenger in the passenger car by using the sensor data. The passenger detection unit 120 outputs passenger information indicating the detected passenger.

Next, the recommended position calculating unit 130A executes a recommended position calculating process (step ST230).

Specifically, first, the recommended position calculating unit 130A acquires the ventilation equipment information and the passenger information. At this time, the recommended position calculating unit 130A acquires the passenger information from the passenger detection unit 120. Next, the recommended position calculating unit 130A outputs recommended position information indicating a recommended position of a passenger in the passenger car by using the ventilation equipment information and the passenger information.

Next, the presentation information generating unit 150A executes a presentation information generating process (step ST240).

Specifically, the presentation information generating unit 150A generates presentation information including a recommended position image by using the recommended position information.

More specifically, first, the presentation information generating unit 150A acquires the recommended position information from the recommended position calculating unit 130A. Next, the presentation information generating unit 150A generates presentation information including a recommended position image by using the recommended position information and referring to the recommended position image database 400A.

In addition, the presentation information generating unit 150A may generate presentation information including a recommended position image indicating a recommended position of a passenger in the passenger car by further using the passenger information.

The presentation information generating unit 150A outputs the presentation information including the recommended position image.

Next, the presentation information output unit 160 executes a presentation information output process (step ST250).

Specifically, the presentation information output unit 160 acquires the presentation information including the recommended position image from the presentation information generating unit 150A, and outputs the acquired presentation information including the recommended position image to the presentation device 200.

Next, a control unit (not illustrated) in the presentation information generation device 100A checks whether there is an end command from the outside (step ST260).

If there is no end command (step ST260 "NO"), the presentation information generation device 100A repeats the processes from step ST210.

If there is an end command (step ST260 "YES"), the processing in the presentation information generation device 100A is ended.

The presentation information generation device according to the present disclosure includes a passenger detection unit that detects a passenger in the passenger car, and the recommended position calculating unit outputs the recommended position information by further using passenger information indicating the passenger detected by the passenger detection unit.

As a result, it is possible to provide a presentation information generation device that generates presentation information for preventing ventilation in a passenger car from being blocked in consideration of a passenger when there is the passenger in the passenger car.

Third Embodiment

In the second embodiment, the mode has been described in which the presentation information indicating a recommended position of a passenger is generated by using the ventilation equipment information and the passenger information.

A third embodiment is a mode in which presentation information indicating a recommended position of a passenger is generated by further using operation information of a passenger car.

In description of the third embodiment, the description of the configuration described in the first or second embodiment will be appropriately omitted.

Figure 7:
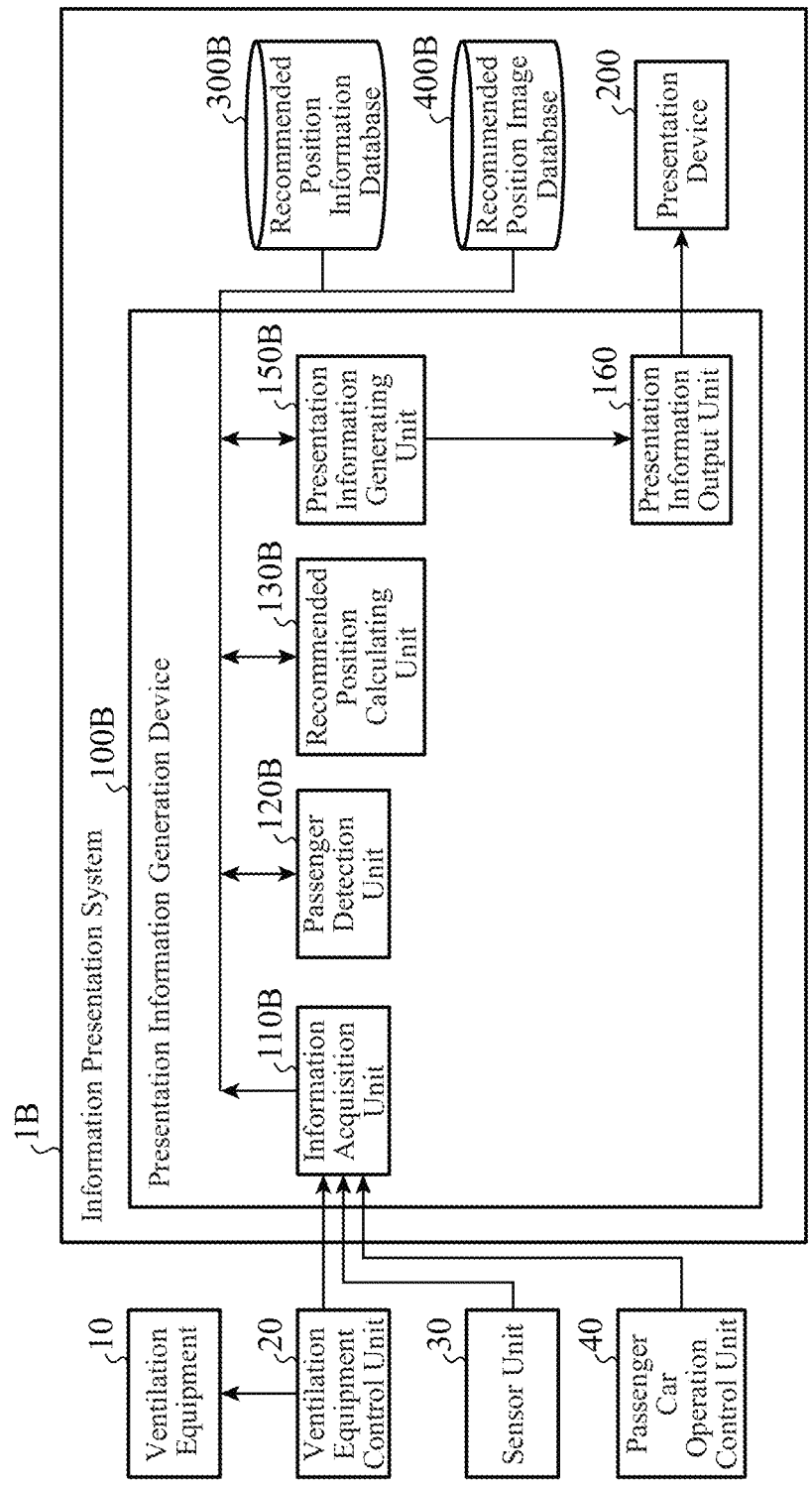
FIG. 7 is a diagram illustrating a presentation information generation device according to a third embodiment of the present disclosure, an information presentation system including the presentation information generation device, and peripheral devices of the information presentation system.

FIG. 7 is a diagram illustrating a presentation information generation device according to the third embodiment of the present disclosure, an information presentation system including the presentation information generation device, and peripheral devices of the information presentation system.

An information presentation system 1B illustrated in FIG. 7 is further communicably connected to a passenger car operation control unit 40.

The passenger car operation control unit 40 controls operation of the passenger car.

The passenger car operation control unit 40 outputs operation information regarding operation of the passenger car.

The operation information is an operating state or an operating situation, and is, for example, information such as a speed or a moving direction.

The information presentation system 1B illustrated in FIG. 7 includes a presentation information generation device 100B, a recommended position information database 300B, a recommended position image database 400B, and a presentation device 200.

The presentation device 200 is similar to the presentation device 200 illustrated in FIG. 1, and description thereof will be omitted.

The presentation information generation device 100B acquires a recommended position in the car interior by using ventilation equipment information, passenger information, and operation information, and generates presentation information in which the recommended position is visualized.

A configuration of the presentation information generation device 100B will be described later.

The recommended position information database 300B stores in advance information indicating a state or a situation in the passenger car and recommended position information in association with each other.

In the third embodiment, the information indicating a state or a situation in the passenger car includes ventilation equipment information, passenger information, and operation information.

The recommended position image database 400B is similar to the recommended position image database 400 illustrated in FIG. 1, and detailed description thereof will be omitted here.

A configuration of the presentation information generation device 100B will be described.

The presentation information generation device 100B illustrated in FIG. 7 includes an information acquisition unit 110B, a passenger detection unit 120B, a recommended position calculating unit 130B, a presentation information generating unit 150B, and a presentation information output unit 160.

The information acquisition unit 110B further acquires operation information.

Specifically, the information acquisition unit 110B acquires the operation information from the passenger car operation control unit 40.

The passenger detection unit 120B is similar to the passenger detection unit 120 illustrated in FIG. 4, and detailed description thereof will be omitted.

The recommended position calculating unit 130B acquires the operation information indicating an operating situation of the passenger car or an operating state of the passenger car, and outputs recommended position information indicating a recommended position of a passenger in the passenger car by further using the operation information. This is performed for obtaining a recommended position of a passenger in consideration of a case where an air flow in the car interior may change depending on movement of the passenger car, which may affect ventilation.

The recommended position calculating unit 130B illustrated in FIG. 7 outputs the recommended position information by using the ventilation equipment information, the passenger information, and the operation information and referring to the recommended position information database 300B.

Note that the recommended position calculating unit 130B may output the recommended position information by using the ventilation equipment information, the passenger information, and the operation information with a model learned in advance by using an AI technique.

Similarly to the presentation information generating unit 150 of the first embodiment or the presentation information generating unit 150A of the second embodiment, the presentation information generating unit 150B generates presentation information including a recommended position image.

In addition, the presentation information generating unit 150B may generate the presentation information by further using the operation information. For example, the presentation information includes an image indicating that the passenger car has been ventilated together with door opening time while the passenger car is stopped.

The presentation information output unit 160 is similar to the presentation information output unit 160 illustrated in FIG. 1, and description thereof will be omitted.

Processing performed in the presentation information generation device 100B according to the third embodiment will be described.

Figure 8:
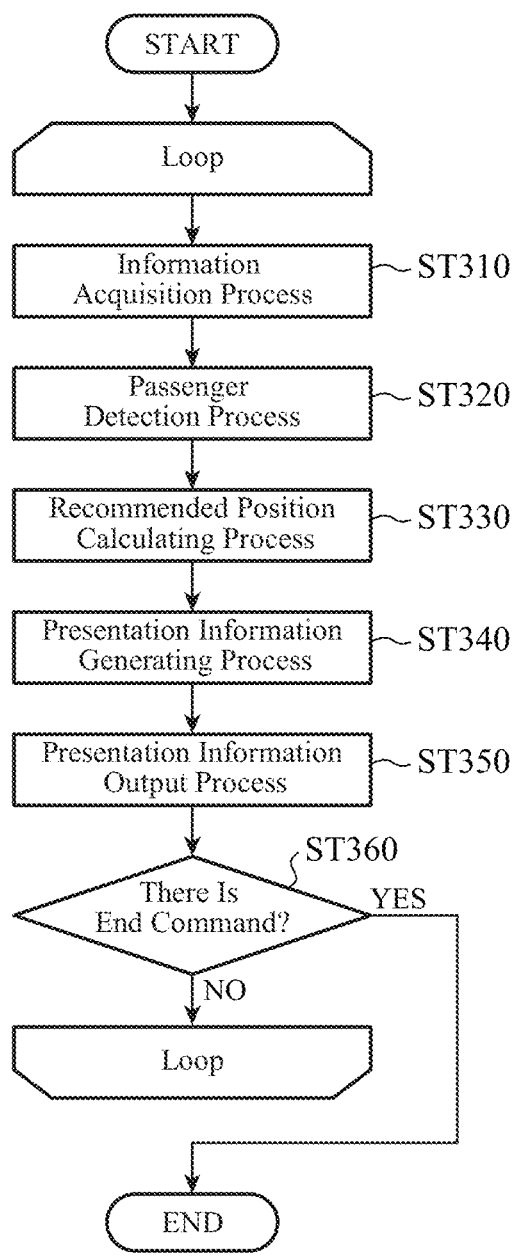
FIG. 8 is a flowchart illustrating processing performed in the presentation information generation device according to the third embodiment.

FIG. 8 is a flowchart illustrating processing performed in the presentation information generation device 100B according to the third embodiment.

For example, when receiving a start command from the outside, the presentation information generation device 100B starts processing and starts loop processing.

In the loop processing, processes from step ST310 to step ST360 illustrated in FIG. 8 are repeated.

First, the information acquisition unit 110B executes an information acquisition process (step ST310).

Specifically, the information acquisition unit 110B acquires ventilation equipment information and sensor data similarly to the information acquisition unit 110A of the second embodiment, and further acquires operation information from the passenger car operation control unit 40.

Next, the passenger detection unit 120B executes a passenger detection process (step ST320).

Specifically, the passenger detection unit 120B acquires the sensor data from the sensor unit 30 via the information acquisition unit 110B. The passenger detection unit 120B detects a passenger in the passenger car by using the sensor data. The passenger detection unit 120B outputs passenger information indicating the detected passenger.

Next, the recommended position calculating unit 130B executes a recommended position calculating process (step ST330).

Specifically, first, the recommended position calculating unit 130B acquires the ventilation equipment information, the passenger information, and the operation information. The recommended position calculating unit 130B acquires the operation information from the passenger car operation control unit 40. Next, the recommended position calculating unit 130B outputs recommended position information indicating a recommended position of a passenger in the passenger car by using the ventilation equipment information, the passenger information, and the operation information.

Next, the presentation information generating unit 150B executes a presentation information generating process (step ST340).

Specifically, the presentation information generating unit 150B generates presentation information including a recommended position image by using the recommended position information.

More specifically, first, the presentation information generating unit 150B acquires the recommended position information from the recommended position calculating unit 130B. Next, the presentation information generating unit 150B generates the presentation information including the recommended position image by using the recommended position information and referring to the recommended position image database 400B.

In addition, the presentation information generating unit 150B may generate presentation information including a recommended position image indicating a recommended position of a passenger in the passenger car by further using the operation information.

The presentation information generating unit 150B outputs the presentation information including the recommended position image.

Next, the presentation information output unit 160 executes a presentation information output process (step ST350).

Specifically, the presentation information output unit 160 acquires the presentation information including the recommended position image from the presentation information generating unit 150B, and outputs the acquired presentation information including the recommended position image to the presentation device 200.

Next, a control unit (not illustrated) in the presentation information generation device 100B checks whether there is an end command from the outside (step ST360).

If there is no end command (step ST360 "NO"), the presentation information generation device 100B repeats the processes from step ST310.

If there is an end command (step ST360 "YES"), the processing in the presentation information generation device 100B is ended.

In the presentation information generation device according to the present disclosure, the recommended position calculating unit acquires operation information indicating an operating situation of the passenger car or an operating state of the passenger car, and outputs the recommended position information by further using the operation information.

As a result, it is possible to provide a presentation information generation device that generates presentation information for preventing ventilation in a passenger car from being blocked in consideration of an operating situation of the passenger car or an operating state of the passenger car.

Fourth Embodiment

In the third embodiment, the mode has been described in which the presentation information indicating a recommended position of a passenger is generated by using the ventilation equipment information, the passenger information, and the operation information of a passenger car.

A fourth embodiment is a mode in which presentation information indicating a recommended position of a passenger is generated by further using sensor data indicating an air environment.

In description of the fourth embodiment, the description of the configuration described in the first, second, or third embodiment will be appropriately omitted.

Figure 9:
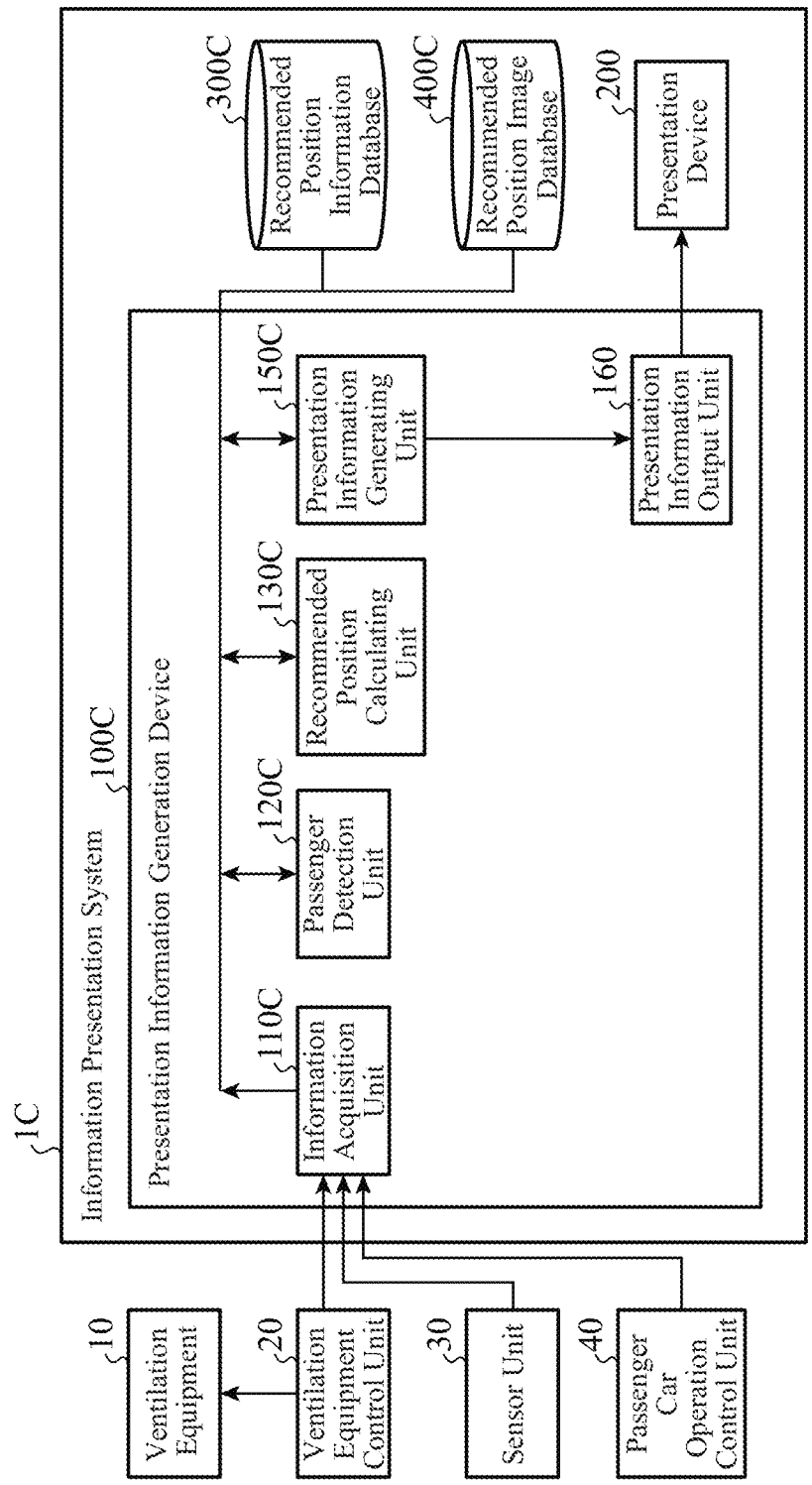
FIG. 9 is a diagram illustrating a presentation information generation device according to a fourth embodiment of the present disclosure, an information presentation system including the presentation information generation device, and peripheral devices of the information presentation system.

FIG. 9 is a diagram illustrating a presentation information generation device according to the fourth embodiment of the present disclosure, an information presentation system including the presentation information generation device, and peripheral devices of the information presentation system.

An information presentation system 1C illustrated in FIG. 9 includes a presentation information generation device 100C, a recommended position information database 300C, a recommended position image database 400C, and a presentation device 200.

The presentation device 200 is similar to the presentation device 200 illustrated in FIG. 1, and description thereof will be omitted.

The presentation information generation device 100C acquires an air flow in the car interior by using ventilation equipment information, passenger information, operation information, and the sensor data, and generates presentation information in which the air flow is visualized.

The sensor data used to acquire an air flow is data indicating an air environment in the car interior, and is, for example, temperature, humidity, air quality, or the like. The air quality is, for example, a carbon dioxide concentration, a particulate substance (PM 1, PM 2.5, PM 10, etc.), or a VOC (organic compound) concentration. The air quality can be measured by using, for example, a non-dispersive infrared absorption (NDIR) type infrared sensor.

A configuration of the presentation information generation device 100C will be described later.

The recommended position information database 300C stores in advance information indicating a state or a situation in the passenger car and recommended position information in association with each other.

In the fourth embodiment, the information indicating a state or a situation in the passenger car includes ventilation equipment information, passenger information, operation information, and sensor data indicating an air environment.

The recommended position image database 400C is similar to the recommended position image database 400 illustrated in FIG. 1, and description thereof will be omitted here.

A configuration of the presentation information generation device 100C will be described.

The presentation information generation device 100C illustrated in FIG. 9 includes an information acquisition unit 110C, a passenger detection unit 120C, a recommended position calculating unit 130C, a presentation information generating unit 150C, and a presentation information output unit 160.

The information acquisition unit 110C further acquires sensor data indicating an air environment in the car interior from the sensor unit 30.

The passenger detection unit 120C is similar to the passenger detection unit 120 illustrated in FIG. 4, and detailed description thereof will be omitted here.

The recommended position calculating unit 130C obtains a recommended position further in consideration of an air environment in the car interior.

Specifically, the recommended position calculating unit 130C acquires the sensor data indicating an air environment in the car interior of the passenger car, and outputs recommended position information indicating a recommended position of a passenger in the passenger car by further using the sensor data.

This is performed in consideration of the fact that a ventilation rate and a three-dimensional air flow can be determined by measuring sensor data indicating an air environment in the car interior of the passenger car or both inside and outside the car.

For example, by measuring a temperature difference between the inside and the outside of the car, it is possible to grasp a degree to which the temperature inside the car approaches the temperature outside the car, and from this, it is possible to estimate a ventilation situation (air flow).

In addition, for example, by measuring a carbon dioxide concentration, it is possible to estimate, from the number of passengers, an increase in the carbon dioxide concentration when ventilation is not performed. Then, it is possible to estimate a ventilation situation (air flow) by using a degree of decrease in the carbon dioxide concentration from the estimated value.

In addition, for example, temperature, humidity, a carbon dioxide concentration, a particulate object, a VOC concentration, and the like are measured at a plurality of places in the car. From a distribution thereof, an air flow that moves between areas can be three-dimensionally grasped on the basis of characteristics such as a characteristic of air that indicates that air flows from an area having a high concentration to an area having a low concentration and a characteristic of air that indicates that air flows from an area having a high temperature or humidity to an area having a low temperature or humidity.

The recommended position calculating unit 130C illustrated in FIG. 9 outputs the recommended position information by using the ventilation equipment information, the passenger information, the operation information, and the sensor data indicating an air environment and referring to the recommended position information database 300C.

Note that the recommended position calculating unit 130C may output the recommended position information by using the ventilation equipment information, the passenger information, the operation information, and the sensor data indicating an air environment with a model learned in advance by using an AI technique.

In addition, the recommended position calculating unit 130C may acquire recommended position information by referring to the recommended position information database 300 that associates the ventilation equipment information, the passenger information, and the operation information with the recommended position information. Then, the recommended position calculating unit 130C may output recommended position information by using the acquired recommended position information and the sensor data indicating an air environment with a model learned in advance by using an AI technique.

Processing performed in the presentation information generation device 100C according to the fourth embodiment will be described.

Figure 10:
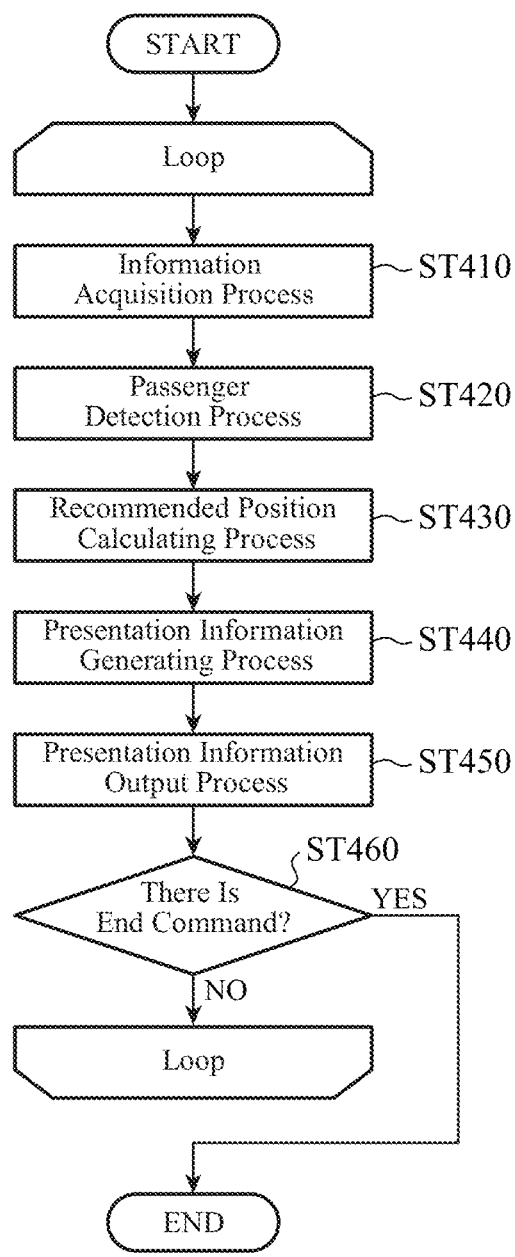
FIG. 10 is a flowchart illustrating processing performed in the presentation information generation device according to the fourth embodiment.

FIG. 10 is a flowchart illustrating processing performed in the presentation information generation device 100C according to the fourth embodiment.

For example, when receiving a start command from the outside, the presentation information generation device 100C starts processing and starts loop processing.

In the loop processing, processes from step ST410 to step ST460 are repeated.

First, the information acquisition unit 110C executes an information acquisition process (step ST410).

Specifically, the information acquisition unit 110C acquires ventilation equipment information, sensor data for detecting a passenger, and operation information similarly to the information acquisition unit 110B of the third embodiment, and further acquires sensor data indicating an air environment from the sensor unit 30.

Next, the passenger detection unit 120C executes a passenger detection process (step ST420).

Specifically, the passenger detection unit 120C acquires the sensor data from the sensor unit 30 via the information acquisition unit 110C. The passenger detection unit 120C detects a passenger in the passenger car by using the sensor data. The passenger detection unit 120C outputs passenger information indicating the detected passenger.

Next, the recommended position calculating unit 130C executes a recommended position calculating process (step ST430).

Specifically, first, the recommended position calculating unit 130C acquires the ventilation equipment information, the passenger information, the operation information, and the sensor data indicating an air environment. The recommended position calculating unit 130C acquires the sensor data from the sensor unit 30. Next, the recommended position calculating unit 130C outputs recommended position information indicating a recommended position of a passenger in the passenger car by using the ventilation equipment information, the passenger information, the operation information, and the sensor data indicating an air environment.

Next, the presentation information generating unit 150C executes a presentation information generating process (step ST440).

Specifically, the presentation information generating unit 150C generates presentation information including a recommended position image by using the recommended position information.

More specifically, first, the presentation information generating unit 150C acquires the recommended position information from the recommended position calculating unit 130C. Next, the presentation information generating unit 150C generates the presentation information including the recommended position image by using the recommended position information and referring to the recommended position image database 400C.

In addition, the presentation information generating unit 150C may generate presentation information including a recommended position image indicating a recommended position of a passenger in the passenger car by further using the operation information.

The presentation information generating unit 150C outputs the presentation information including the recommended position image.

Next, the presentation information output unit 160 executes a presentation information output process (step ST450).

Specifically, the presentation information output unit 160 acquires the presentation information including the recommended position image from the presentation information generating unit 150C, and outputs the acquired presentation information including the recommended position image to the presentation device 200.

Next, a control unit (not illustrated) in the presentation information generation device 100C checks whether there is an end command from the outside (step ST460).

If there is no end command (step ST460 "NO"), the presentation information generation device 100C repeats the processes from step ST410.

If there is an end command (step ST460 "YES"), the processing in the presentation information generation device 100C is ended.

In the presentation information generation device according to the present disclosure, the recommended position calculating unit acquires sensor data indicating an air environment in the car interior of the passenger car, and outputs the recommended position information by further using the sensor data.

As a result, it is possible to provide a presentation information generation device that generates presentation information for preventing ventilation in the passenger car from being blocked further in consideration of a real-time air environment in the car interior.

Fifth Embodiment

In the first to fourth embodiments, the mode has been described in which a recommended position of a passenger is presented.

A fifth embodiment is a mode in which an air flow in the car interior is further obtained, and a ventilation command is issued depending on the air flow.

In description of the fifth embodiment, the description of the configuration described in the first, second, third, or fourth embodiment will be appropriately omitted.

Figure 11:
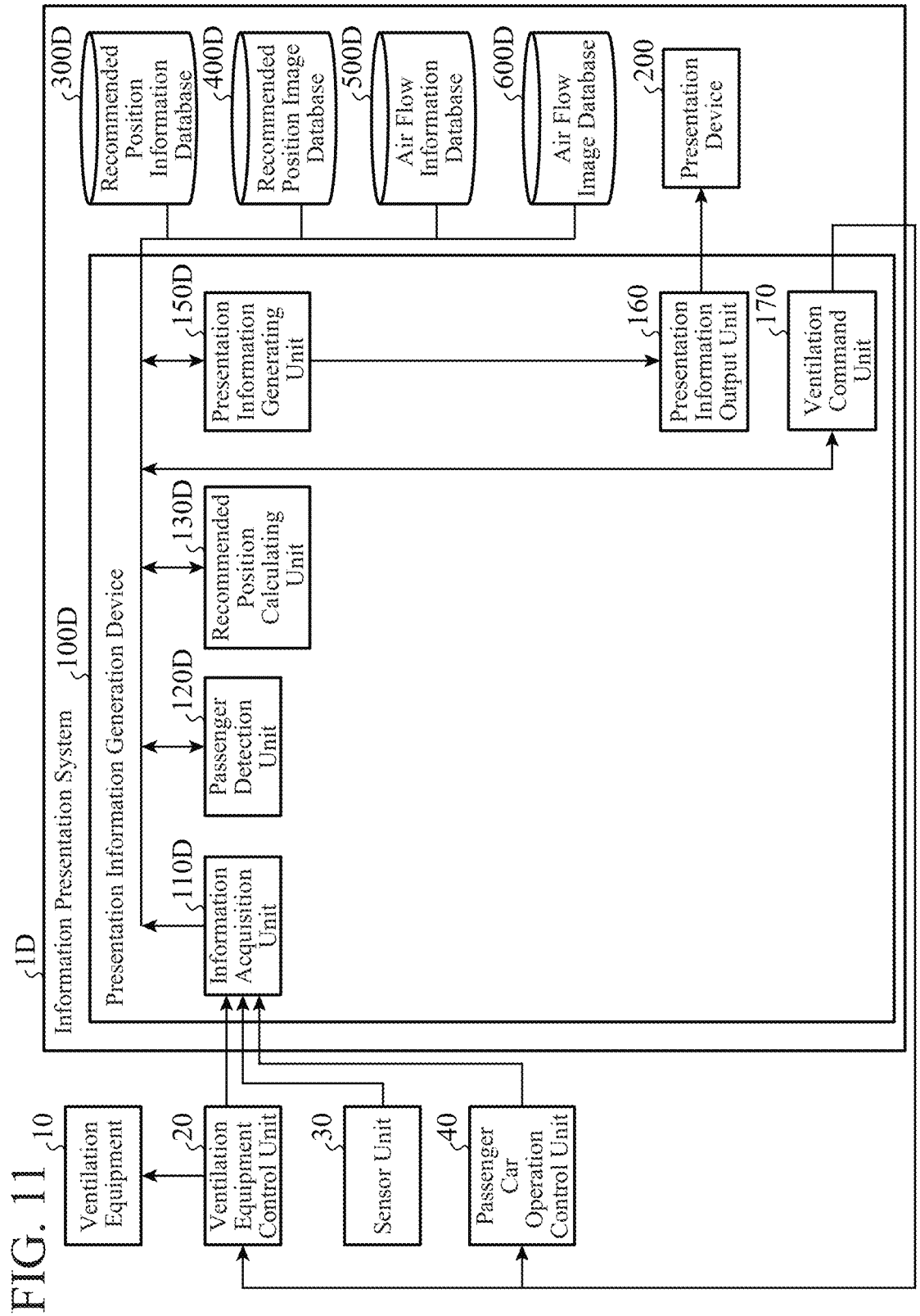
FIG. 11 is a diagram illustrating a presentation information generation device according to a fifth embodiment of the present disclosure, an information presentation system including the presentation information generation device, and peripheral devices of the information presentation system.

FIG. 11 is a diagram illustrating a presentation information generation device 100D according to the fifth embodiment of the present disclosure, an information presentation system 1D including the presentation information generation device, and peripheral devices of the information presentation system.

The information presentation system 1D illustrated in FIG. 11 includes the presentation information generation device 100D, a presentation device 200, a recommended position information database 300D, a recommended position image database 400D, an air flow information database 500D, and an air flow image database 600D.

The presentation device 200 is similar to the presentation device 200 illustrated in FIG. 1, and description thereof will be omitted.

The recommended position information database 300D is similar to the recommended position information database 300C illustrated in FIG. 9, and detailed description thereof will be omitted here.

The recommended position image database 400D is similar to the recommended position image database 400C illustrated in FIG. 9, and detailed description thereof will be omitted here.

The air flow information database 500D stores in advance information indicating a state or a situation in the passenger car and air flow information in association with each other.

In the fifth embodiment, the information indicating a state or a situation in the passenger car includes ventilation equipment information, passenger information, operation information, and sensor data indicating an air environment.

The air flow information is, for example, a ventilation rate. The ventilation rate can be obtained by using, for example, an operating state and an operating situation of ventilation equipment, an operating state and an operating situation of the passenger car, and the passenger information (the number of passengers, a position of the passenger, a physique of the passenger, and the like). Specifically, first, a ventilation amount per unit time is obtained depending on an operating state and an operating situation of the ventilation equipment, and an operating state and an operating situation of the passenger car. Next, the ventilation rate can be obtained by using the ventilation amount per unit time, a time required for ventilation based on the passenger information (the number of passengers, a position of the passenger, a physique of the passenger, and the like), an elapsed time after a door of the passenger car is closed, and the like.

The air flow information is, for example, information indicating an air flow depending on an operating state and an operating situation of the ventilation equipment. Specifically, for example, the air flow information is information indicating a vertical air flow that occurs when the ventilation equipment in the ceiling central portion and the ventilation equipment in the floor central portion are in operation.

In addition, the air flow information is, for example, information indicating an air flow depending on an operating state and an operating situation of the passenger car. Specifically, the air flow information is, for example, information indicating a ventilation amount and an air flow depending on a time during which a door is open, or information indicating a ventilation amount and an air flow due to the ascent or descent.

In addition, the air flow information is information indicating an air flow direction at each position in the car interior. Furthermore, the air flow information may be information including strength of the air flow at each position in the car interior. The positions in the car interior only need to include position coordinates of at least two or more points in the car interior, and may be indicated by two-dimensional coordinates or three-dimensional coordinates. In the case of the three-dimensional coordinates, it is possible for presentation information generated by the presentation information generation device 100D to three-dimensionally visualize and present an air flow in the car interior. The air flow at each position in the car interior can be obtained by using the sensor data indicating an air environment.

The air flow image database 600D stores in advance an image used when the presentation information generation device 100D generates presentation information.

The image stored in the air flow image database 600D is, for example, an image such as a two-dimensional image or a three-dimensional image indicating the car interior of the passenger car, an air flow image representing an air flow, or an air flow image representing an air flow with a text.

The air flow image is stored in association with the air flow information.

That is, the air flow image database 600D stores in advance a relationship between the air flow information and the air flow image indicating a state of an air flow.

A configuration of the presentation information generation device 100D will be described.

The presentation information generation device 100D illustrated in FIG. 11 includes an information acquisition unit 110D, a passenger detection unit 120D, a recommended position calculating unit 130D, a presentation information generating unit 150D, a presentation information output unit 160, and a ventilation command unit 170.

The presentation information generation device 100D newly includes the ventilation command unit 170.

The information acquisition unit 110D is similar to the information acquisition unit 110C illustrated in FIG. 9, and detailed description thereof will be omitted here.

The passenger detection unit 120D is similar to the passenger detection unit 120C illustrated in FIG. 9, and detailed description thereof will be omitted here.

The recommended position calculating unit 130D illustrated in FIG. 11 outputs the recommended position information by using the ventilation equipment information, the passenger information, the operation information, and the sensor data indicating an air environment and referring to the recommended position information database 300D. Note that the recommended position calculating unit 130D may output the recommended position information by using the ventilation equipment information, the passenger information, the operation information, and the sensor data indicating an air environment with a model learned in advance by using an AI technique.

In addition, the recommended position calculating unit 130D may acquire recommended position information by referring to the recommended position information database 300 that associates the ventilation equipment information, the passenger information, and the operation information with the recommended position information. Then, the recommended position calculating unit 130D may output recommended position information by using the acquired recommended position information and the sensor data indicating an air environment with a model learned in advance by using an AI technique.

Similarly to the recommended position calculating unit 130C, the recommended position calculating unit 130D illustrated in FIG. 11 outputs the recommended position information.

In addition, the recommended position calculating unit 130D outputs air flow information.

Specifically, first, the recommended position calculating unit 130D acquires ventilation equipment information, passenger information, operation information, and sensor data indicating an air environment. The recommended position calculating unit 130D acquires the sensor data from the sensor unit 30. Next, the recommended position calculating unit 130D outputs air flow information regarding an air flow in the passenger car by using the ventilation equipment information, the passenger information, the operation information, and the sensor data indicating an air environment. More specifically, the recommended position calculating unit 130D outputs the air flow information by using the ventilation equipment information, the passenger information, the operation information, and the sensor data indicating an air environment and referring to the air flow information database 500D.

The presentation information output unit 160 is similar to the presentation information output unit 160 in the other embodiments, and detailed description thereof will be omitted here.

The ventilation command unit 170 commands the ventilation equipment to perform ventilation on the basis of the passenger information or the air flow information.

In addition, the ventilation command unit 170 issues a command indicating a door opening time of the passenger car on the basis of the passenger information and the air flow information. This enables ventilation in a short time in the car interior of the passenger car.

The presentation information generating unit 150D generates presentation information similarly to the presentation information generating unit 150C illustrated in FIG. 9.

In addition, the presentation information generating unit 150D may generate an air flow image including the time indicated in the command issued by the ventilation command unit 170. As a result, for example, it is possible to achieve a mode in which a door opening time of the passenger car when the passenger car stops is presented together with the fact that this is for the purpose of ventilation.

Processing performed in the presentation information generation device 100D according to the fifth embodiment will be described.

Figure 12:
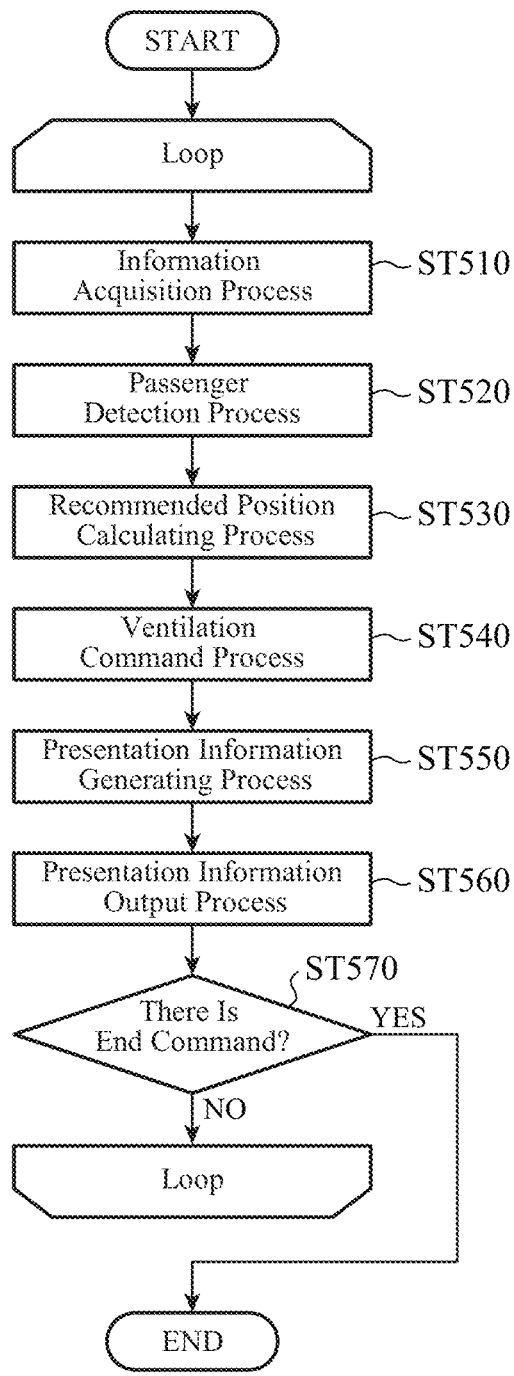
FIG. 12 is a flowchart illustrating processing performed in the presentation information generation device according to the fifth embodiment.

FIG. 12 is a flowchart illustrating processing performed in the presentation information generation device 100D according to the fifth embodiment.

For example, when receiving a start command from the outside, the presentation information generation device 100D starts processing and starts loop processing.

In the loop processing, processes from step ST510 to step ST570 are repeated.

First, the information acquisition unit 110D executes an information acquisition process as in the fourth embodiment (step ST510).

Next, the passenger detection unit 120D executes a passenger detection process as in the fourth embodiment (step ST520).

Next, the recommended position calculating unit 130D executes a recommended position calculating process (step ST530).

First, the recommended position calculating unit 130D acquires ventilation equipment information, passenger information, and operation information.

The recommended position calculating unit 130D acquires sensor data indicating an air environment from the sensor unit 30.

Next, the recommended position calculating unit 130D outputs air flow information regarding an air flow in the passenger car by using the ventilation equipment information, the passenger information, the operation information, and the sensor data indicating an air environment. Specifically, the recommended position calculating unit 130D outputs the air flow information by using the ventilation equipment information, the passenger information, the operation information, and the sensor data indicating an air environment and referring to the air flow information database 500D.

Next, the ventilation command unit 170 executes a ventilation command process (step ST540).

The ventilation command unit 170 issues a command to perform ventilation on the basis of the passenger information and the air flow information.

Specifically, the ventilation command unit 170 commands the ventilation equipment to perform ventilation using the passenger information and the air flow information. In this case, first, the ventilation command unit 170 acquires the passenger information and the air flow information. Next, the ventilation command unit 170 calculates a remaining space, a position of the face of a passenger, an orientation of the face of the passenger, and the like by using the passenger information. Next, the ventilation command unit 170 calculates an air flow to be generated on the basis of the remaining space, the position of the face of the passenger, the orientation of the face of the passenger, and the like, and the air flow information. Next, the ventilation command unit 170 determines a piece of ventilation equipment that generates the calculated air flow. Next, the ventilation command unit 170 commands the determined piece of ventilation equipment to perform ventilation.

In addition, the ventilation command unit 170 issues a command indicating a door opening time of the passenger car on the basis of the passenger information and the air flow information. In this case, for example, when a ventilation rate is lower than a threshold, the ventilation command unit 170 further determines a door opening time of the passenger car when the door is opened next time. Next, the ventilation command unit 170 issues a command indicating the door opening time to the passenger car operation control unit 40.

Next, the presentation information generating unit 150D executes a presentation information generating process (step ST550).

When executing the presentation information generating process, the presentation information generating unit 150D may generate an air flow image including the time indicated in the command issued by the ventilation command unit 170, add the air flow image to the presentation information, and output the presentation information to the presentation information output unit 160.

Next, the presentation information output unit 160 executes a presentation information output process as in the fourth embodiment (step ST560).

Next, a control unit (not illustrated) in the presentation information generation device 100D checks whether there is an end command from the outside (step ST570).

If there is no end command (step ST570 "NO"), the presentation information generation device 100D repeats the processes from step ST510.

If there is an end command (step ST570 "YES"), the processing in the presentation information generation device 100D is ended.

The presentation information generation device according to the present disclosure includes a ventilation command unit that commands the ventilation equipment to perform ventilation on the basis of the passenger information or the air flow information.

As a result, it is possible to achieve ventilation by the ventilation equipment further in consideration of an air flow in the passenger car.

In the presentation information generation device according to the present disclosure, the recommended position calculating unit outputs air flow information indicating a state of an air flow in the passenger car together with the recommended position information.

As a result, it is possible to achieve a process further in consideration of an air flow in the passenger car.

Sixth Embodiment

A sixth embodiment is a mode in which a recommended position further in consideration of a scheduled passenger is used.

In description of the sixth embodiment, the description of the configuration described in the first, second, third, fourth, or fifth embodiment will be appropriately omitted.

Figure 13:
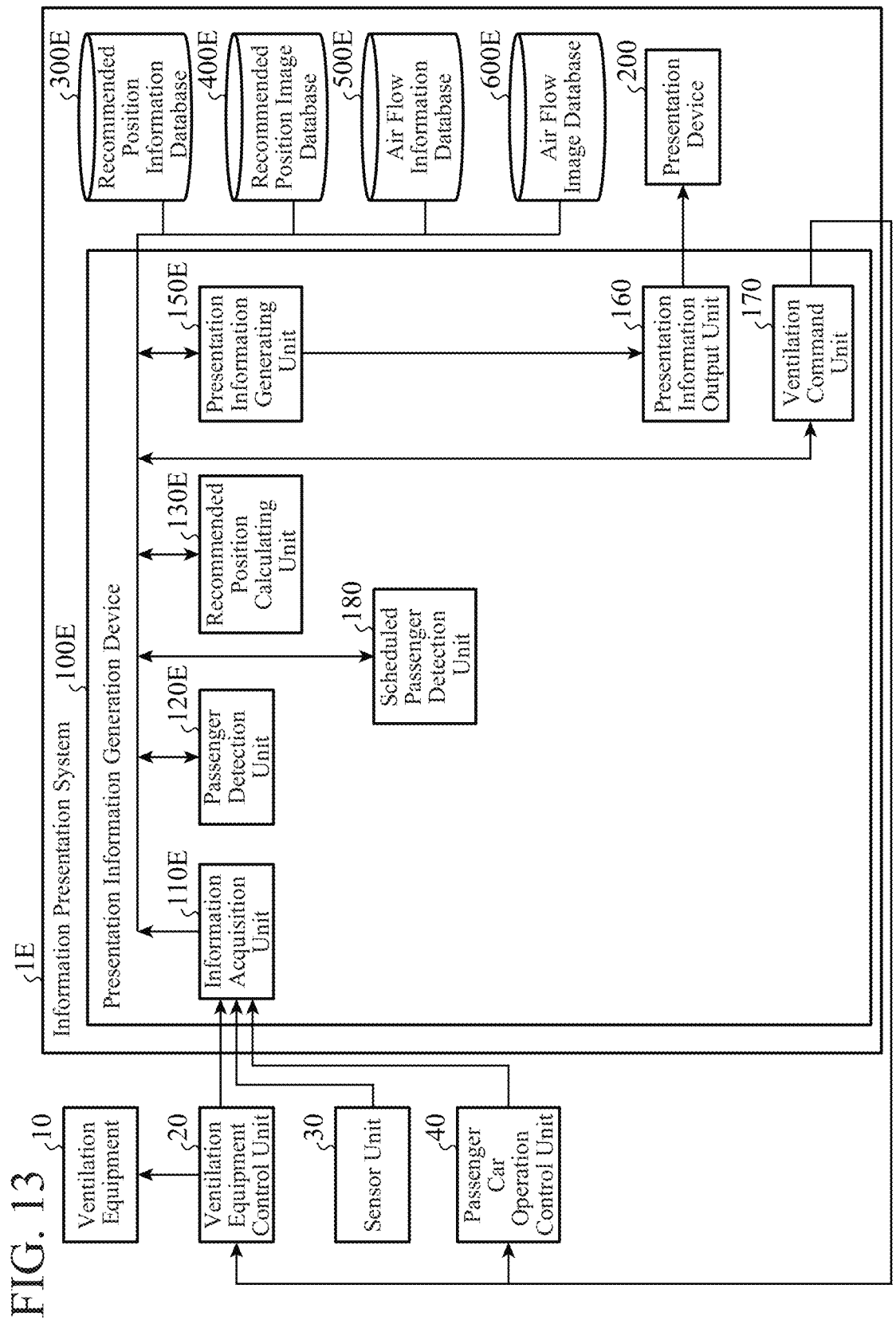
FIG. 13 is a diagram illustrating a presentation information generation device according to a sixth embodiment of the present disclosure, an information presentation system including the presentation information generation device, and peripheral devices of the information presentation system.

FIG. 13 is a diagram illustrating a presentation information generation device according to the sixth embodiment of the present disclosure, an information presentation system including the presentation information generation device, and peripheral devices of the information presentation system.

An information presentation system 1E illustrated in FIG. 13 includes a presentation information generation device 100E, a presentation device 200, a recommended position information database 300E, a recommended position image database 400E, an air flow information database 500E, and an air flow image database 600E.

A configuration of the presentation information generation device 100E will be described later.

The presentation device 200 is similar to the presentation device 200 illustrated in FIG. 1, and description thereof will be omitted.

The recommended position information database 300E stores in advance information indicating a state or a situation in the passenger car and recommended position information in association with each other.

In the sixth embodiment, the information indicating a state or a situation in the passenger car includes ventilation equipment information, passenger information, operation information, sensor data indicating an air environment, and scheduled passenger information.

The recommended position image database 400E is similar to the recommended position image database 400D illustrated in FIG. 11, and detailed description thereof will be omitted here.

The air flow information database 500E stores in advance information indicating a state or a situation in the passenger car and air flow information in association with each other.

In the sixth embodiment, the information indicating a state or a situation in the passenger car includes ventilation equipment information, passenger information, operation information, sensor data indicating an air environment, and scheduled passenger information.

The air flow image database 600E is similar to the air flow image database 600D illustrated in FIG. 11, and detailed description thereof will be omitted here.

A configuration of the presentation information generation device 100E will be described.

The presentation information generation device 100E illustrated in FIG. 13 includes an information acquisition unit 110E, a passenger detection unit 120E, a recommended position calculating unit 130E, a presentation information generating unit 150E, a presentation information output unit 160, a ventilation command unit 170, and a scheduled passenger detection unit 180.

The presentation information generation device 100E newly includes the scheduled passenger detection unit 180.

The scheduled passenger detection unit 180 detects a passenger who is scheduled to get on a passenger car at a next getting-on/off opportunity of the passenger car which is in operation, and outputs scheduled passenger information.

Specifically, first, the scheduled passenger detection unit 180 acquires a captured image obtained by imaging each getting-on/off place of the passenger car from a camera 33 (monitoring camera) in a sensor unit 30. For example, the scheduled passenger detection unit 180 performs image analysis by using a captured image of a getting-on/off place where the passenger car stops next time. Thereby, the scheduled passenger detection unit 180 detects a scheduled passenger included in the captured image, and outputs scheduled passenger information.

The recommended position calculating unit 130E acquires the scheduled passenger information indicating the passenger who is scheduled to get on the passenger car at a next getting-on/off opportunity of the passenger car which is in operation, and outputs recommended position information by further using the scheduled passenger information.

Processing performed in the presentation information generation device 100E according to the sixth embodiment will be described.

Figure 14:
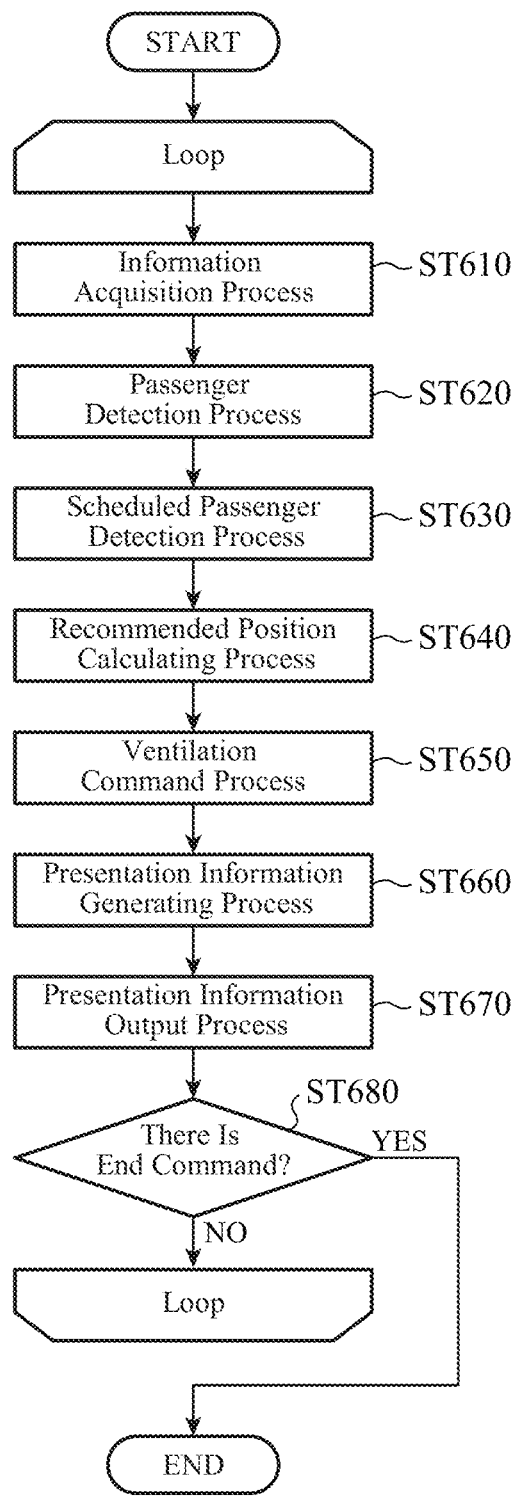
FIG. 14 is a flowchart illustrating processing performed in the presentation information generation device according to the sixth embodiment.

FIG. 14 is a flowchart illustrating processing performed in the presentation information generation device 100E according to the sixth embodiment.

For example, when receiving a start command from the outside, the presentation information generation device 100E starts processing and starts loop processing.

In the loop processing, processes from step ST610 to step ST680 are repeated.

First, the information acquisition unit 110E executes an information acquisition process as in the fifth embodiment (step ST610).

Next, the passenger detection unit 120E executes a passenger detection process as in the fifth embodiment (step ST620).

Next, the scheduled passenger detection unit 180 executes a scheduled passenger detection process (step ST630).

Specifically, first, the scheduled passenger detection unit 180 acquires a captured image obtained by imaging each getting-on/off place of the passenger car from the camera 33 (monitoring camera) in the sensor unit 30. For example, the scheduled passenger detection unit 180 performs image analysis by using a captured image of a getting-on/off place where the passenger car stops next time. Thereby, the scheduled passenger detection unit 180 detects a scheduled passenger included in the captured image, and outputs scheduled passenger information.

Next, the recommended position calculating unit 130E executes a recommended position calculating process (step ST640).

First, the recommended position calculating unit 130E acquires ventilation equipment information, passenger information, and operation information.

The recommended position calculating unit 130E acquires sensor data indicating an air environment from the sensor unit 30.

Next, the recommended position calculating unit 130E outputs air flow information regarding an air flow in the passenger car by using the ventilation equipment information, the passenger information, the operation information, and the sensor data indicating an air environment. Specifically, the recommended position calculating unit 130E outputs the air flow information by using the ventilation equipment information, the passenger information, the operation information, and the sensor data indicating an air environment and referring to the air flow information database 500E.

Next, the ventilation command unit 170 executes a ventilation command process (step ST650).

The ventilation command unit 170 issues a command to perform ventilation on the basis of the passenger information and the air flow information.

Specifically, the ventilation command unit 170 commands the ventilation equipment to perform ventilation using the passenger information and the air flow information. In this case, first, the ventilation command unit 170 acquires the passenger information and the air flow information. Next, the ventilation command unit 170 calculates a remaining space, a position of the face of a passenger, an orientation of the face of the passenger, and the like by using the passenger information. Next, the ventilation command unit 170 calculates an air flow to be generated on the basis of the remaining space, the position of the face of the passenger, the orientation of the face of the passenger, and the like, and the air flow information. Next, the ventilation command unit 170 determines a piece of ventilation equipment that generates the calculated air flow. Next, the ventilation command unit 170 commands the determined piece of ventilation equipment to perform ventilation.

In addition, the ventilation command unit 170 issues a command indicating a door opening time of the passenger car on the basis of the passenger information and the air flow information. In this case, for example, when a ventilation rate is lower than a threshold, the ventilation command unit 170 further determines a door opening time of the passenger car when the door is opened next time. Next, the ventilation command unit 170 issues a command indicating the door opening time to the passenger car operation control unit 40.

Next, the presentation information generating unit 150E executes a presentation information generating process (step ST660).

When executing the presentation information generating process, the presentation information generating unit 150E may generate an air flow image including the time indicated in the command issued by the ventilation command unit 170, add the air flow image to the presentation information, and output the presentation information to the presentation information output unit 160.

Next, the presentation information output unit 160 executes a presentation information output process as in the fourth embodiment (step ST670).

Next, a control unit (not illustrated) in the presentation information generation device 100E checks whether there is an end command from the outside (step ST680).

If there is no end command (step ST680 "NO"), the presentation information generation device 100E repeats the processes from step ST610.

If there is an end command (step ST680 "YES"), the processing in the presentation information generation device 100E is ended.

In the presentation information generation device according to the present disclosure, the recommended position calculating unit acquires scheduled passenger information indicating a passenger who is scheduled to get on a passenger car at a next getting-on/off opportunity of the passenger car which is in operation, and outputs the recommended position information by further using the scheduled passenger information.

As a result, it is possible to provide a presentation information generation device that generates presentation information for preventing ventilation in a passenger car from being blocked further in consideration of a passenger who is scheduled to get on the passenger car.

The presentation information generation device according to the present disclosure further includes a scheduled passenger detection unit that detects the passenger who is scheduled to get on the passenger car at the next getting-on/off opportunity of the passenger car which is in operation, and outputs the scheduled passenger information.

As a result, it is further possible to adopt the presentation information generation device in a system that cannot detect a passenger who is scheduled to get on a passenger car.

Seventh Embodiment

A seventh embodiment is a mode in which an air flow in a car interior is obtained together with a recommended position, and the air flow is presented together with the recommended position.

In description of the seventh embodiment, the description of the configuration described in the first, second, third, fourth, fifth, or sixth embodiment will be appropriately omitted.

Figure 15:
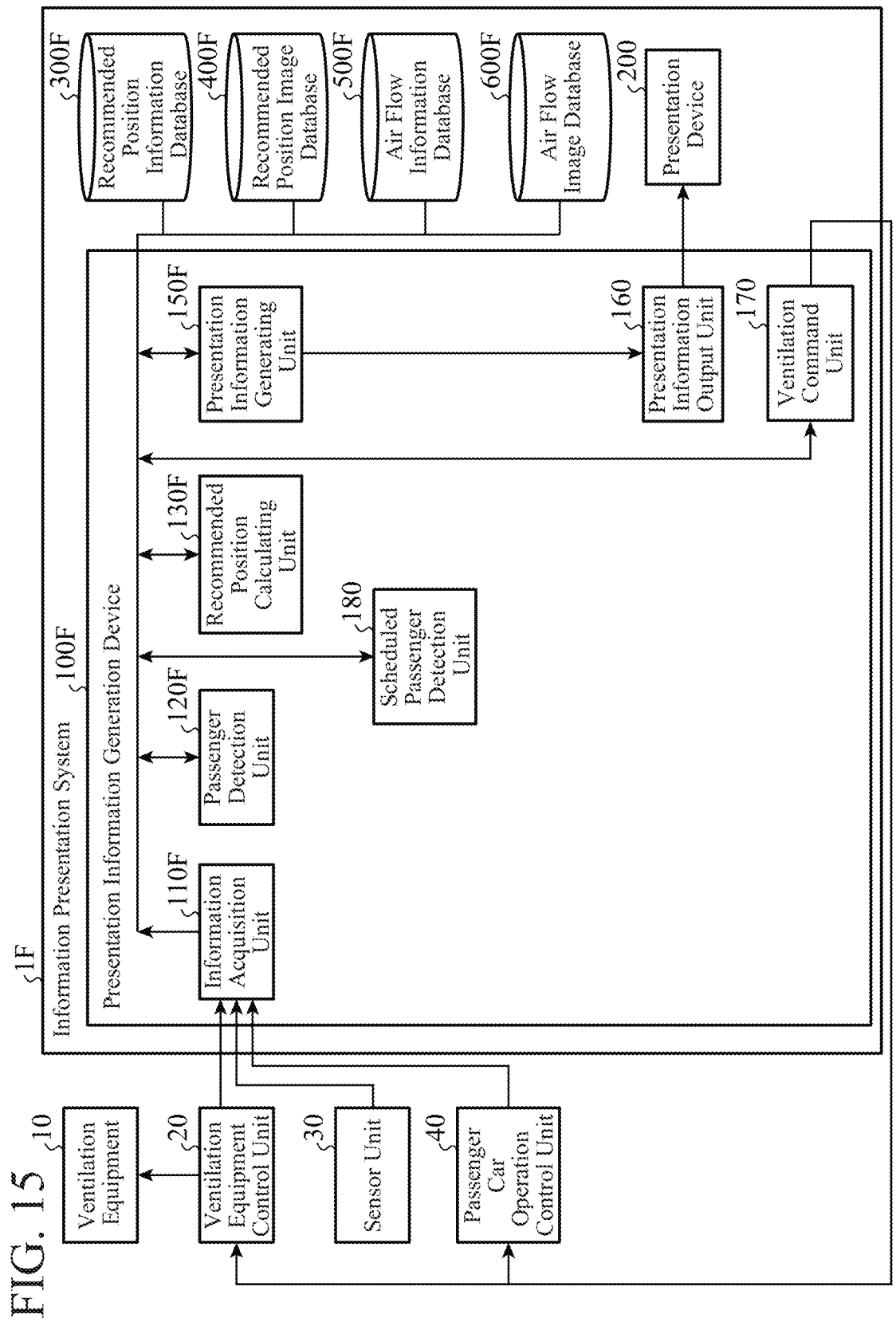
FIG. 15 is a diagram illustrating a presentation information generation device according to a seventh embodiment of the present disclosure, an information presentation system including the presentation information generation device, and peripheral devices of the information presentation system.

FIG. 15 is a diagram illustrating a presentation information generation device according to the seventh embodiment of the present disclosure, an information presentation system including the presentation information generation device, and peripheral devices of the information presentation system.

An information presentation system 1F illustrated in FIG. 15 includes a presentation information generation device 100F, a presentation device 200, a recommended position information database 300F, a recommended position image database 400F, an air flow information database 500F, and an air flow image database 600F.

Since the presentation device 200, the recommended position information database 300F, the recommended position image database 400F, the air flow information database 500F, and the air flow image database 600F are similar to the presentation device 200, the recommended position information database 300E, the recommended position image database 400E, the air flow information database 500E, and the air flow image database 600E in FIG. 13, respectively, detailed descriptions thereof will be omitted here.

The presentation information generation device 100F illustrated in FIG. 15 includes an information acquisition unit 110F, a passenger detection unit 120F, a recommended position calculating unit 130F, a presentation information generating unit 150F, a presentation information output unit 160, a ventilation command unit 170, and a scheduled passenger detection unit 180.

Since the units excluding the presentation information generating unit 150F are similar to the information acquisition unit 110E, the passenger detection unit 120E, the recommended position calculating unit 130E, the presentation information output unit 160, the ventilation command unit 170, and the scheduled passenger detection unit 180 illustrated in FIG. 13, detailed description thereof will be omitted here.

The presentation information generating unit 150F presents an air flow image by further using air flow information.

Specifically, the presentation information generating unit 150F further acquires and outputs an air flow image indicating a state of an air flow in a passenger car by using the air flow information, and the presentation information output unit further outputs the air flow information to the presentation device.

Figure 16:
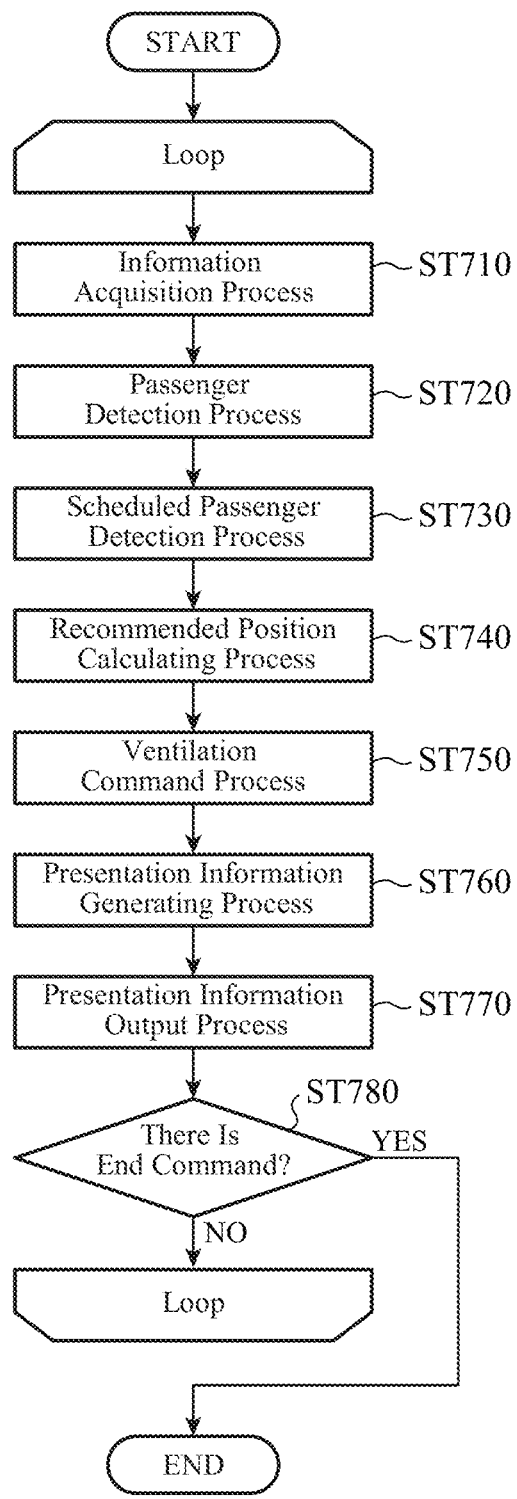
FIG. 16 is a flowchart illustrating processing performed in the presentation information generation device according to the seventh embodiment.

FIG. 16 is a flowchart illustrating processing performed in the presentation information generation device 100F according to the seventh embodiment.

For example, when receiving a start command from the outside, the presentation information generation device 100F starts processing and starts loop processing.

In the loop processing, processes from step ST710 to step ST780 are repeated.

First, the information acquisition unit 110F executes an information acquisition process as in the sixth embodiment (step ST710).

Next, the passenger detection unit 120F executes a passenger detection process as in the sixth embodiment (step ST720).

Next, the scheduled passenger detection unit 180 executes a scheduled passenger detection process (step ST730).

Specifically, first, the scheduled passenger detection unit 180 acquires a captured image obtained by imaging each getting-on/off place of the passenger car from a camera 33 (monitoring camera) in a sensor unit 30. For example, the scheduled passenger detection unit 180 performs image analysis by using a captured image of a getting-on/off place where the passenger car stops next time. Thereby, the scheduled passenger detection unit 180 detects a scheduled passenger included in the captured image, and outputs scheduled passenger information.

Next, the recommended position calculating unit 130F executes a recommended position calculating process (step ST740).

First, the recommended position calculating unit 130F acquires ventilation equipment information, passenger information, and operation information.

The recommended position calculating unit 130F acquires sensor data indicating an air environment from the sensor unit 30.

Next, the recommended position calculating unit 130F outputs air flow information regarding an air flow in the passenger car by using the ventilation equipment information, the passenger information, the operation information, and the sensor data indicating an air environment. Specifically, the recommended position calculating unit 130E outputs the air flow information by using the ventilation equipment information, the passenger information, the operation information, and the sensor data indicating an air environment and referring to the air flow information database 500E.

Next, the ventilation command unit 170 executes a ventilation command process (step ST750).

The ventilation command unit 170 issues a command to perform ventilation on the basis of the passenger information and the air flow information.

Specifically, the ventilation command unit 170 commands the ventilation equipment to perform ventilation using the passenger information and the air flow information. In this case, first, the ventilation command unit 170 acquires the passenger information and the air flow information. Next, the ventilation command unit 170 calculates a remaining space, a position of the face of a passenger, an orientation of the face of the passenger, and the like by using the passenger information. Next, the ventilation command unit 170 calculates an air flow to be generated on the basis of the remaining space, the position of the face of the passenger, the orientation of the face of the passenger, and the like, and the air flow information. Next, the ventilation command unit 170 determines a piece of ventilation equipment that generates the calculated air flow. Next, the ventilation command unit 170 commands the determined piece of ventilation equipment to perform ventilation.

In addition, the ventilation command unit 170 issues a command indicating a door opening time of the passenger car on the basis of the passenger information and the air flow information. In this case, for example, when a ventilation rate is lower than a threshold, the ventilation command unit 170 further determines a door opening time of the passenger car when the door is opened next time. Next, the ventilation command unit 170 issues a command indicating the door opening time to the passenger car operation control unit 40.

Next, the presentation information generating unit 150F executes a presentation information generating process (step ST760).

The presentation information generating unit 150F outputs presentation information including an image superimposed on an image representing the car interior of the passenger car by using a recommended position image based on the recommended position information and an air flow image based on the air flow information.

When executing the presentation information generating process, the presentation information generating unit 150F may generate a recommended position image including the time indicated in the command issued by the ventilation command unit 170, add the recommended position image to the presentation information, and output the presentation information to the presentation information output unit 160.

Next, the presentation information output unit 160 executes a presentation information output process as in the fourth embodiment (step ST770).

Next, a control unit (not illustrated) in the presentation information generation device 100F checks whether there is an end command from the outside (step ST780).

If there is no end command (step ST780 "NO"), the presentation information generation device 100F repeats the processes from step ST710.

If there is an end command (step ST780 "YES"), the processing in the presentation information generation device 100F is ended.

In the presentation information generation device according to the present disclosure, the presentation information generating unit further acquires and outputs an air flow image indicating a state of an air flow in the passenger car by using the air flow information, and the presentation information output unit further outputs the air flow information to the presentation device.

As a result, the recommended position can be presented, and furthermore, an air flow in the passenger car can be presented. In addition, a reason for the recommended position is easily recognized by a passenger, and therefore the passenger can be efficiently guided to the recommended position.

Here, a presentation example using the presentation information according to the present disclosure will be described.

Figure 17:
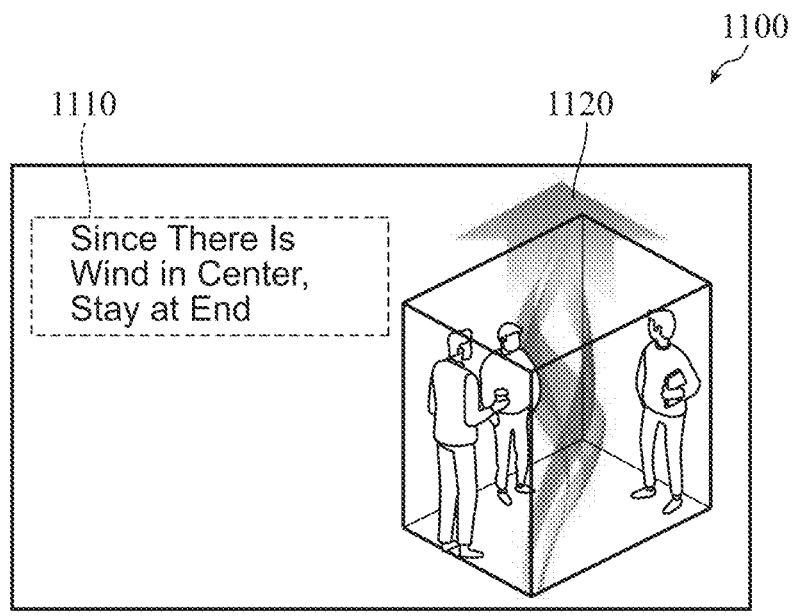
FIG. 17 is a diagram illustrating a first presentation example by the presentation information generation device according to the present disclosure.

FIG. 17 is a diagram illustrating a first presentation example by the presentation information generation device according to the present disclosure.

A presentation image 1100 is an example of an image to be presented on the presentation device 200 by using presentation information generated according to the present disclosure.

In the presentation image 1100, a message image 1110 indicating a recommended position and an arrowed image 1120 are superimposed on an image representing the car interior of the passenger car in a visible state.

In the message image 1110, a message "Since there is wind in the center, stay at an end" is displayed.

The arrowed image 1120 represents an air flow from a central floor surface to a ceiling.

This is an image based on presentation information generated by using recommended position information indicating that an end in the car interior is a recommended position and air flow information indicating an air flow from bottom to top in the center of the car interior.

Figure 18:
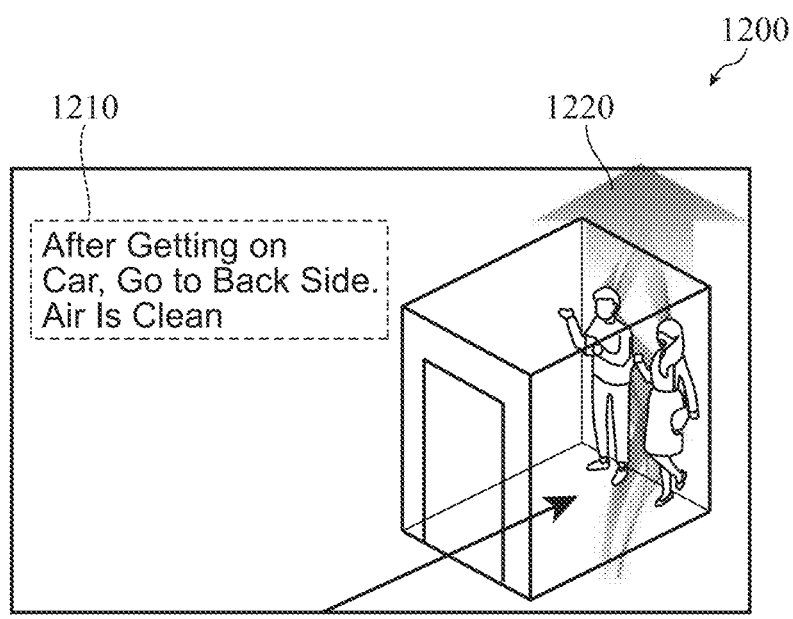
FIG. 18 is a diagram illustrating a second presentation example by the presentation information generation device according to the present disclosure.

FIG. 18 is a diagram illustrating a second presentation example by the presentation information generation device according to the present disclosure.

A presentation image 1200 is an example of an image to be presented on the presentation device 200 by using presentation information generated according to the present disclosure.

In the presentation image 1200, a message image 1210 indicating a recommended position and an arrowed image 1220 are superimposed on an image representing the car interior of the passenger car in a visible state.

In the message image 1210, messages "After getting on the car, go to a back side" and "Air is clean" are displayed.

The arrowed image 1220 represents an air flow from a floor surface to a ceiling on a back side in the car interior with respect to a door of the passenger car.

This is an image based on presentation information generated by using recommended position information indicating that a position where there is an air flow on a back side in the car interior is a recommended position and air flow information indicating an air flow from bottom to top on the back side in the car interior.

Figure 19:
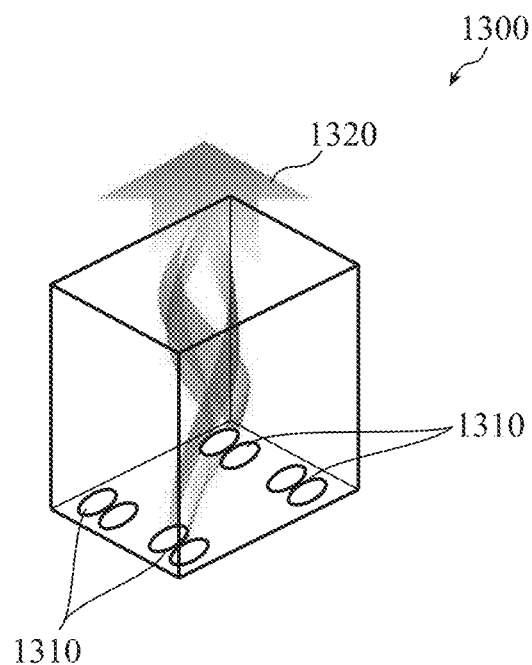
FIG. 19 is a diagram illustrating a third presentation example by the presentation information generation device according to the present disclosure.

FIG. 19 is a diagram illustrating a third presentation example by the presentation information generation device according to the present disclosure.

A presentation image 1300 is an example of an image to be presented on the presentation device 200 by using presentation information generated according to the present disclosure.

In the presentation image 1300, an image 1310 indicating a recommended position and an arrowed image 1320 are superimposed on an image representing the car interior of the passenger car in a visible state.

The image 1310 is a foot-shaped image at the recommended position.

The arrowed image 1320 represents an air flow from bottom to top in the center of the car interior.

This is an image based on presentation information generated by using recommended position information indicating that an end in the car interior is a recommended position and air flow information indicating an air flow from bottom to top in the center of the car interior.

Figure 20:
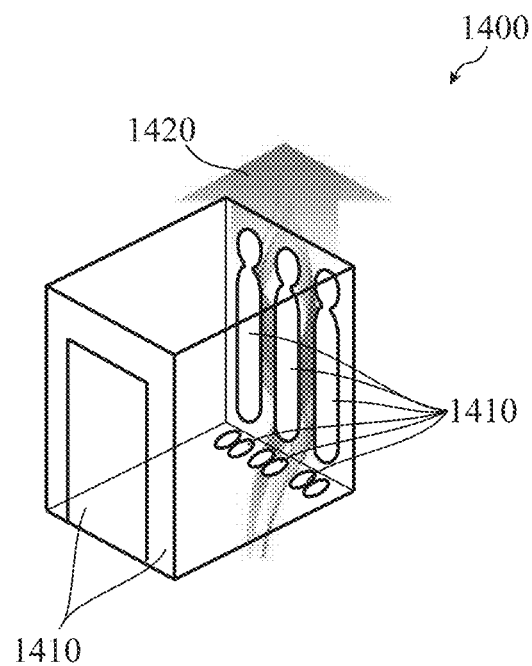
FIG. 20 is a diagram illustrating a fourth presentation example by the presentation information generation device according to the present disclosure.

FIG. 20 is a diagram illustrating a fourth presentation example by the presentation information generation device according to the present disclosure.

A presentation image 1400 is an example of an image to be presented on the presentation device 200 by using presentation information generated according to the present disclosure.

In the presentation image 1400, an image 1410 indicating a recommended position and an arrowed image 1420 are superimposed on an image representing the car interior of the passenger car in a visible state.

The image 1410 indicating the recommended position includes a human-shaped image and a foot-shaped image.

The arrowed image 1420 represents an air flow from a floor surface to a ceiling on a back side in the car interior with respect to a door of the passenger car.

This is an image based on presentation information generated by using recommended position information indicating that a position where there is an air flow on a back side in the car interior is a recommended position and air flow information indicating an air flow from bottom to top on the back side in the car interior.

Figure 21:
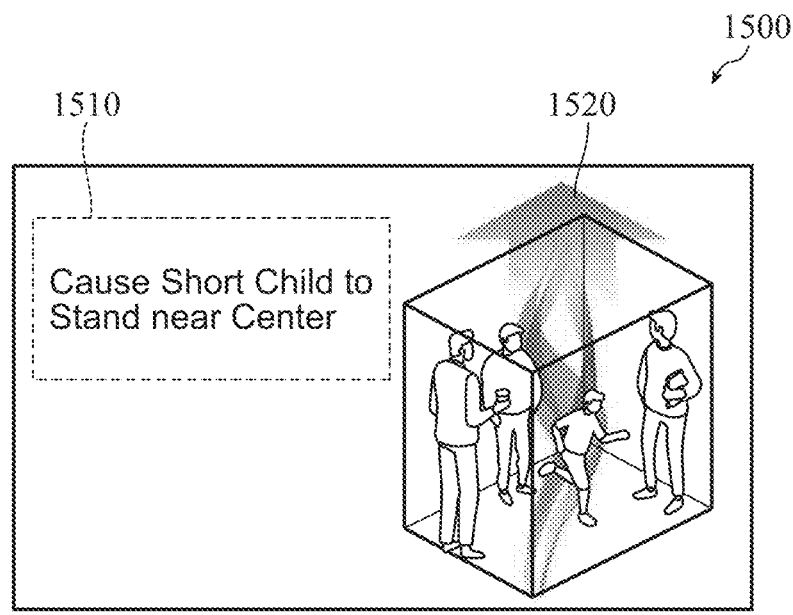
FIG. 21 is a diagram illustrating a fifth presentation example by the presentation information generation device according to the present disclosure.

FIG. 21 is a diagram illustrating a fifth presentation example by the presentation information generation device according to the present disclosure.

A presentation image 1500 is an example of an image to be presented on the presentation device 200 by using presentation information generated according to the present disclosure.

In the presentation image 1500, a message image 1510 and an arrowed image 1520 are superimposed on an image representing the car interior of the passenger car in a visible state.

The message image 1510 includes messages such as "short child", "near the center", and "cause him or her to stand".

The arrowed image 1520 represents an air flow from bottom to top in the center of the car interior.

This is an image based on presentation information generated by using recommended position information indicating that a recommended position for a passenger whose height is equal to or less than a threshold is a central portion and air flow information indicating an air flow from bottom to top in the center of the car interior.

Here, a hardware configuration that implements functions of the presentation information generation device 100 (100A, 100B, 100C, 100D, 100E, or 100F) according to the present disclosure will be described.

Figure 22:
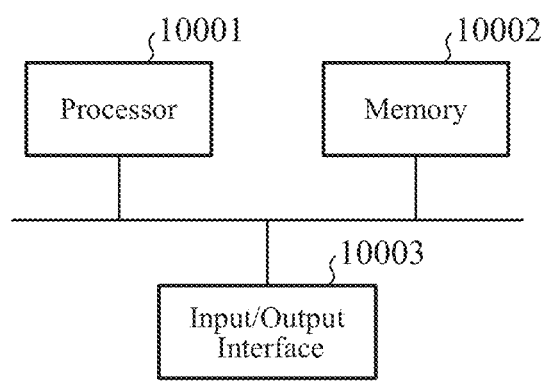
FIG. 22 is a diagram illustrating a first example of a hardware configuration for implementing a function of the presentation information generation device according to the present disclosure.

FIG. 22 is a diagram illustrating a first example of the hardware configuration for implementing the functions of the presentation information generation device 100 (100A, 100B, 100C, 100D, 100E, or 100F) according to the present disclosure.

Figure 23:
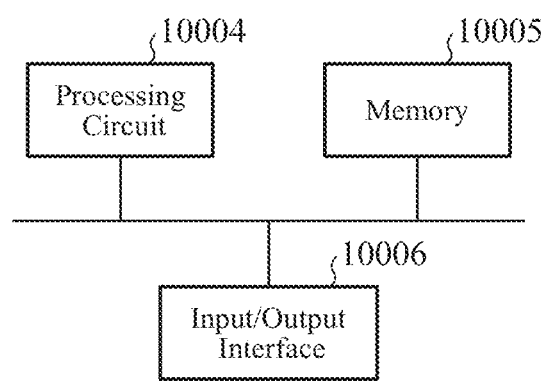
FIG. 23 is a diagram illustrating a second example of the hardware configuration for implementing the function of the presentation information generation device according to the present disclosure.

FIG. 23 is a diagram illustrating a second example of the hardware configuration for implementing the functions of the presentation information generation device 100 (100A, 100B, 100C, 100D, 100E, or 100F) according to the present disclosure.

The presentation information generation device 100 (100A, 100B, 100C, 100D, 100E, or 100F) of the present disclosure is implemented by hardware as illustrated in FIG. 23 or 22.

The presentation information generation device 100 (100A, 100B, 100C, 100D, 100E, or 100F) includes a processor 10001 and a memory 10002 as illustrated in FIG. 22.

The processor 10001 and the memory 10002 are mounted on a computer, for example.

The memory 10002 stores a program for causing the computer to function as the information acquisition unit 110 (110A, 110B, 110C, 110D, 110E, or 110F), the passenger detection unit 120 (120B, 120C, 120D, 120E, or 120F), the recommended position calculating unit 130 (130A, 130B, 130C, 130D, 130E, or 130F), the presentation information generating unit 150 (150A, 150B, 150C, 150D, 150E, or 150F), the presentation information output unit 160, the ventilation command unit 170, and the control unit (not illustrated). By the processor 10001 reading and executing the program stored in the memory 10002, the functions of the information acquisition unit 110 (110A, 110B, 110C, 110D, 110E, or 110F), the passenger detection unit 120 (120B, 120C, 120D, 120E, or 120F), the recommended position calculating unit 130 (130A, 130B, 130C, 130D, 130E, or 130F), the presentation information generating unit 150 (150A, 150B, 150C, 150D, 150E, or 150F), the presentation information output unit 160, the ventilation command unit 170, and the control unit (not illustrated) are implemented.

In addition, a storage unit (not illustrated) is implemented by the memory 10002 or another memory (not illustrated).

The processor 10001 uses, for example, a central processing unit (CPU), a graphics processing unit (GPU), a microprocessor, a microcontroller, or a digital signal processor (DSP).

The memory 10002 may be a nonvolatile or volatile semiconductor memory such as a random access memory (RAM), a read only memory (ROM), an erasable programmable ROM (EPROM), or an electrically erasable programmable read only memory (EEPROM), may be a magnetic disk such as a hard disk or a flexible disk, may be an optical disc such as a compact disc (CD) or a digital versatile disc (DVD), or may be a magneto-optical disk.

The processor 10001 and the memory 10002 are connected in a state where data can be transmitted between the processor 10001 and the memory 10002. In addition, the processor 10001 and the memory 10002 are connected in a state where data can be transmitted between the processor 10001 and the memory 10002, and other hardware via an input/output interface 10003.

Alternatively, the functions of the information acquisition unit 110 (110A, 110B, 110C, 110D, 110E, or 110F), the passenger detection unit 120 (120B, 120C, 120D, 120E, or 120F), the recommended position calculating unit 130 (130A, 130B, 130C, 130D, 130E, or 130F), the presentation information generating unit 150 (150A, 150B, 150C, 150D, 150E, or 150F), the presentation information output unit 160, the ventilation command unit 170, and the control unit (not illustrated) may be implemented by a dedicated processing circuit 10004 as illustrated in FIG. 23.

The processing circuit 10004 uses, for example, a single circuit, a composite circuit, a programmed processor, a parallel programmed processor, an application specific integrated circuit (ASIC), a programmable logic device (PLD), a field-programmable gate array (FPGA), a system-on-a-chip (SoC), or a system large-scale integration (LSI).

In addition, a storage unit (not illustrated) is implemented by a memory 10005 or another memory (not illustrated).

The memory 10005 may be a nonvolatile or volatile semiconductor memory such as a random access memory (RAM), a read only memory (ROM), an erasable programmable ROM (EPROM), or an electrically erasable programmable read only memory (EEPROM), may be a magnetic disk such as a hard disk or a flexible disk, may be an optical disc such as a compact disc (CD) or a digital versatile disc (DVD), or may be a magneto-optical disk.

The processing circuit 10004 and the memory 10005 are connected in a state where data can be transmitted between the processing circuit 10004 and the memory 10005. In addition, the processing circuit 10004 and the memory 10005 are connected in a state where data can be transmitted between the processing circuit 10004 and the memory 10005, and other hardware via an input/output interface 10006.

Note that the functions of the information acquisition unit 110 (110A, 110B, 110C, 110D, 110E, or 110F), the passenger detection unit 120 (120B, 120C, 120D, 120E, or 120F), the recommended position calculating unit 130 (130A, 130B, 130C, 130D, 130E, or 130F), the presentation information generating unit 150 (150A, 150B, 150C, 150D, 150E, or 150F), the presentation information output unit 160, the ventilation command unit 170, and the control unit (not illustrated) may be implemented by different processing circuits, or may be collectively implemented by a processing circuit.

Alternatively, some of the functions of the information acquisition unit 110 (110A, 110B, 110C, 110D, 110E, or 110F), the passenger detection unit 120 (120B, 120C, 120D, 120E, or 120F), the recommended position calculating unit 130 (130A, 130B, 130C, 130D, 130E, or 130F), the presentation information generating unit 150 (150A, 150B, 150C, 150D, 150E, or 150F), the presentation information output unit 160, the ventilation command unit 170, and the control unit (not illustrated) may be implemented by the processor 10001 and the memory 10002, and the remaining functions may be implemented by the processing circuit 10004.

Note that, in the present disclosure, the embodiments can be freely combined with one another, any component in the embodiments can be modified, or any component in the embodiments can be omitted within the scope of the present invention.

INDUSTRIAL APPLICABILITY

The presentation information generation device according to the present disclosure is suitable for use in, for example, an information presentation system that presents information in a passenger car of an elevator disposed in a building or the like.

REFERENCE SIGNS LIST

1: information presentation system, 10 (11, 12, 13, 14, 15, 16, 17): ventilation equipment, 20: ventilation equipment control unit, 30: sensor unit, 40: passenger car operation control unit, 100, 100A, 100B, 100C, 100D, 100E, 100F: presentation information generation device, 110, 110A, 110B, 110C, 110D, 110E, 110F: information acquisition unit, 120, 120B, 120C, 120D, 120E, 120F: passenger detection unit, 130, 130A, 130B, 130C, 130D, 130E, 130F: recommended position calculating unit (air flow calculating unit), 150, 150A, 150B, 150C, 150D, 150E, 150F: presentation information generating unit, 160: presentation information output unit, 170: ventilation command unit, 200: presentation device, 300, 300A, 300B, 300C, 300D, 300E, 300F: recommended position information database, 400, 400A, 400B, 400C, 400D, 400E, 400F: recommended position image database, 500D, 500E, 500F: air flow information database, 600D, 600E, 600F: air flow image database, 1000, 1100, 1200, 1300: air flow image, 10001: processor, 10002: memory, 10003: input/output interface, 10004: processing circuit, 10005: memory, 10006: input/output interface

The invention claimed is:

1. A presentation information generation device comprising:
   recommended position calculating circuitry to acquire ventilation equipment information indicating a state of ventilation equipment in a passenger car and to output recommended position information of a passenger by using the ventilation equipment information;
   presentation information generating circuitry to generate and output recommended position presenting information indicating a recommended position of the passenger in the passenger car by using the recommended position information output by the recommended position calculating circuitry;
   presentation information output circuitry to output, to a presentation device including a display, a speaker, or a projector, the recommended position presenting information generated by the presentation information generating circuitry; and
   ventilation command circuitry to determine a piece of ventilation equipment based on the recommended position for the passenger and to control the determined piece of ventilation equipment to perform ventilation in accordance with at least the recommended position for the passenger and a calculated airflow.

2. The presentation information generation device according to claim 1, comprising passenger detection circuitry to detect the passenger in the passenger car, wherein
   the recommended position calculating circuitry outputs the recommended position information by further using passenger information indicating the passenger detected by the passenger detection circuitry.

3. The presentation information generation device according to claim 1, wherein
   the recommended position calculating circuitry acquires operation information indicating an operating situation of the passenger car or an operating state of the passenger car, and outputs the recommended position information by further using the operation information.

4. The presentation information generation device according to claim 1, wherein
   the recommended position calculating circuitry acquires sensor data indicating an air environment (a temperature distribution or a carbon dioxide concentration) in a car interior of the passenger car, and outputs the recommended position information by further using the sensor data.

5. The presentation information generation device according to claim 1, wherein
   the recommended position calculating circuitry acquires scheduled passenger information indicating a passenger who is scheduled to get on the passenger car at a next getting-on/off opportunity of the passenger car which is in operation, and outputs the recommended position information by further using the scheduled passenger information.

6. The presentation information generation device according to claim 5, further comprising scheduled passenger detection circuitry to detect the passenger who is scheduled to get on the passenger car at the next getting-on/off opportunity of the passenger car which is in operation, and to output the scheduled passenger information.

7. The presentation information generation device according to claim 1, wherein the ventilation equipment is disposed in such a way as to generate a plurality of air flows including at least an air flow between a ceiling central portion and a floor central portion in a car interior of the passenger car.

8. The presentation information generation device according to claim 7, wherein the recommended position calculating circuitry outputs air flow information indicating a state of an air flow in the passenger car together with the recommended position information.

9. The presentation information generation device according to claim 8, wherein the presentation information generating circuitry further acquires and outputs an air flow image indicating the state of the air flow in the passenger car by using the air flow information, and the presentation information output circuitry further outputs the air flow information to the presentation device.

10. A presentation information generation method comprising:

acquiring ventilation equipment information indicating a state of ventilation equipment in a passenger car and outputting recommended position information of a passenger by using the ventilation equipment information;

generating and outputting recommended position presenting information indicating a recommended position of the passenger in the passenger car by using the recommended position information;

outputting, to a presentation device including a display, a speaker, or a projector, the recommended position presenting information;

determining a piece of ventilation equipment based on the recommended position for the passenger; and controlling the determined piece of ventilation equipment to perform ventilation in accordance with at least the recommended position for the passenger and a calculated airflow.

11. The presentation information generation method according to claim 10, further comprising detecting the passenger in the passenger car, and outputting the recommended position information by further using passenger information indicating the passenger detected.

12. The presentation information generation method according to claim 10, further comprising acquiring operation information indicating an operating situation of the passenger car or an operating state of the passenger car, and outputting the recommended position information by further using the operation information.

13. The presentation information generation method according to claim 10, further comprising acquiring sensor data indicating an air environment (a temperature distribution or a carbon dioxide concentration) in a car interior of the passenger car, and outputting the recommended position information by further using the sensor data.

14. The presentation information generation method according to claim 10, further comprising acquiring scheduled passenger information indicating a passenger who is scheduled to get on the passenger car at a next getting-on/off opportunity of the passenger car which is in operation, and outputting the recommended position information by further using the scheduled passenger information.

15. The presentation information generation method according to claim 14, further comprising detecting the passenger who is scheduled to get on the passenger car at the next getting-on/off opportunity of the passenger car which is in operation, and outputting the scheduled passenger information.

16. The presentation information generation method according to claim 10, wherein the ventilation equipment is disposed in such a way as to generate a plurality of air flows including at least an air flow between a ceiling central portion and a floor central portion in a car interior of the passenger car.

17. The presentation information generation method according to claim 16, further comprising outputting air flow information indicating a state of an air flow in the passenger car together with the recommended position information.

* * * * *